United States Patent
Ohuchi

(10) Patent No.: US 11,102,123 B2
(45) Date of Patent: Aug. 24, 2021

(54) SENSOR NETWORK SYSTEM

(71) Applicant: NEC Corporation, Tokyo (JP)

(72) Inventor: Masayoshi Ohuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 16/491,232

(22) PCT Filed: Mar. 9, 2018

(86) PCT No.: PCT/JP2018/009230
§ 371 (c)(1),
(2) Date: Sep. 5, 2019

(87) PCT Pub. No.: WO2018/180369
PCT Pub. Date: Oct. 4, 2018

(65) Prior Publication Data
US 2020/0036635 A1    Jan. 30, 2020

(30) Foreign Application Priority Data
Mar. 28, 2017    (JP) .............................. JP2017-062787

(51) Int. Cl.
*H04L 12/801*    (2013.01)
*H04L 12/66*    (2006.01)
(Continued)

(52) U.S. Cl.
CPC .............. *H04L 47/12* (2013.01); *G16Y 40/20* (2020.01); *G16Y 40/35* (2020.01); *H04L 12/66* (2013.01);
(Continued)

(58) Field of Classification Search
CPC ..... H04L 47/12; H04L 12/66; H04L 49/3027; H04L 47/283; H04L 43/0894;
(Continued)

(56) References Cited

U.S. PATENT DOCUMENTS

2013/0148507 A1    6/2013    Wen et al.
2013/0170342 A1    7/2013    Alnuem
(Continued)

FOREIGN PATENT DOCUMENTS

JP    2010-178185 A    8/2010
JP    2011-142439 A    7/2011
(Continued)

OTHER PUBLICATIONS

Japanese Office Action for JP Application No. 2019-509157 dated Jul. 1, 2020 with English Translation.
(Continued)

*Primary Examiner* — Backhean Tiv
*Assistant Examiner* — Joseph M Cousins
(74) *Attorney, Agent, or Firm* — Sughrue Mion, PLLC

(57) ABSTRACT

A server device includes a determination unit and a control unit. The determination unit determines the degree of congestion of a communication network on the basis of a difference between the time difference, between the transmission time and the reception time of sensor data transmitted from a gateway device to the server device, and the communication period of time taken in a state where congestion does not occur. The control unit determines a sensor device from which sensor data is collected and a sensor device in which collection of sensor data is withheld on the
(Continued)

| EDGE GATEWAY NAME | TRANSMISSION/ RECEPTION TIME VARIATION PATTERN | GROUP NAME | SENSOR DATA NAME | PRIORITY | AVERAGE DATA SIZE | AVERAGE TRANSMISSION TIME | TRANSMITTABLE NUMBER |
|---|---|---|---|---|---|---|---|
| EDGE GATEWAY A | PATTERN X | A | A1 | HIGH | 3Mbps | 30s | 1 |
| | | | A2 | LOW | 5Mpbs | 50s | 1 |
| EDGE GATEWAY B | PATTERN Y | BC | B1 | HIGH | 14Mbps | 140s | 1 |
| | | | B2 | LOW | 5Mpbs | 50s | 0 |
| EDGE GATEWAY C | PATTERN Y | BC | C1 | HIGH | 15Mbps | 150s | 1 |
| | | | C2 | LOW | 8Mpbs | 80s | 0 | basis of the determination result of the degree of congestion of the communication network, and sends an instruction including the determined content to the gateway device.

4 Claims, 14 Drawing Sheets

(51) Int. Cl.
  *H04L 12/26* (2006.01)
  *H04L 12/935* (2013.01)
  *H04L 29/08* (2006.01)
  *G16Y 40/35* (2020.01)
  *G16Y 40/20* (2020.01)

(52) U.S. Cl.
  CPC .............. *H04L 43/10* (2013.01); *H04L 47/11* (2013.01); *H04L 49/3027* (2013.01); *H04L 67/12* (2013.01)

(58) Field of Classification Search
  CPC ..... H04L 43/0852; H04L 67/12; H04L 47/11; H04L 43/10; H04Q 9/00; G08C 15/00
  See application file for complete search history.

(56) References Cited

U.S. PATENT DOCUMENTS

| | | | |
|---|---|---|---|
| 2014/0269257 A1* | 9/2014 | Mandiganal | H04W 84/12 370/221 |
| 2016/0261481 A1* | 9/2016 | Ogata | H04L 43/10 |
| 2017/0085447 A1* | 3/2017 | Chen | H04L 43/024 |
| 2017/0270129 A1 | 9/2017 | Ohuchi | |
| 2017/0310608 A1* | 10/2017 | Kulick | H04L 47/82 |
| 2017/0339598 A1 | 11/2017 | Yamamoto et al. | |
| 2018/0139270 A1 | 5/2018 | Inoue et al. | |
| 2018/0234318 A1* | 8/2018 | Cox | H04L 43/0823 |

FOREIGN PATENT DOCUMENTS

| | | |
|---|---|---|
| JP | 5097631 B2 | 12/2012 |
| JP | 2013-123130 A | 6/2013 |
| JP | 2016-146542 A | 8/2016 |
| WO | 2016/047096 A1 | 3/2016 |
| WO | 2016/189926 A1 | 12/2016 |

OTHER PUBLICATIONS

International Search Report for PCT Application No. PCT/JP2018/009230, dated Apr. 24, 2018.

\* cited by examiner

FIG. 2

| SENSOR DATA NAME | NUMBER OF NON-TRANSMITTED DATA |
|---|---|
| CARD READER 110 | 0 |
| MONITORING CAMERA 120 | 0 |

FIG. 3

| SENSOR DATA NAME | NUMBER OF TRANSMITTABLE DATA |
|---|---|
| CARD READER 110 | 1 |
| MONITORING CAMERA 120 | 1 |

FIG. 4

| EDGE GATEWAY NAME | SENSOR DATA NAME | PRIORITY | AVERAGE DATA SIZE | AVERAGE TRANSMISSION PERIOD | NUMBER OF TRANSMITTABLE DATA |
|---|---|---|---|---|---|
| GATEWAY 100 | CARD READER 110 | INTERMEDIATE | 10byte | 0.00001ms | 1 |
| GATEWAY 100 | MONITORING CAMERA 120 | INTERMEDIATE | 1Mbyte | 10s | 1 |
| .... | .... | .... | .... | .... | .... |

FIG. 13

| EDGE GATEWAY NAME | TRANSMISSION/ RECEPTION TIME VARIATION PATTERN | GROUP NAME | SENSOR DATA NAME | PRIORITY | AVERAGE DATA SIZE | AVERAGE TRANSMISSION TIME | TRANSMITTABLE NUMBER |
|---|---|---|---|---|---|---|---|
| EDGE GATEWAY A | PATTERN X | A | A1 | HIGH | 3Mbps | 30s | 1 |
| | | | A2 | LOW | 5Mpbs | 50s | 1 |
| EDGE GATEWAY B | PATTERN Y | BC | B1 | HIGH | 14Mbps | 140s | 1 |
| | | | B2 | LOW | 5Mpbs | 50s | 0 |
| EDGE GATEWAY C | PATTERN Y | BC | C1 | HIGH | 15Mbps | 150s | 1 |
| | | | C2 | LOW | 8Mpbs | 80s | 0 |

SENSOR NETWORK SYSTEM

This application is a National Stage Entry of PCT/JP2018/009230 filed on Mar. 9, 2018, which claims priority from Japanese Patent Application 2017-062787 filed on Mar. 28, 2017, the contents of all of which are incorporated herein by reference, in their entirety.

TECHNICAL FIELD

The present invention relates to a sensor network system, a server device, a sensor data collection controlling method, a gateway device, and a program.

BACKGROUND ART

A sensor network system configured of a sensor device, a gateway device, and a server device has been proposed and put into practice. A sensor network system is a type of an Internet of Things (IoT) system.

A sensor device includes a sensor, a communication device, and a microprocessor, performs observation by the sensor, and transmits obtained sensor data in a wired or wireless manner. A gateway device includes a communication device and a microcomputer, and transmits sensor data received from a sensor device to a server device over a communication network such as Ethernet (registered trademark). The server device collects sensor data from the gateway device over the communication network, and performs accumulation, analysis, display of the sensor data, notification to an application, and the like.

In such a sensor network system, as a technique of preventing congestion on a communication network connecting a gateway device and a server device, a method in which an upper limit is set to the transmission amount so as not to exceed a predetermined maximum transmission amount has been known (see Patent Literature 1, for example).

Patent Literature 1: JP 5097631 B

SUMMARY

Although a technique of preventing congestion on a communication network connecting a gateway device and a server device constituting a sensor network system has been proposed as described above, there is a case where occurrence of congestion cannot be prevented by such a technique. For example, when the communication network is not dedicated for the sensor network system but is shared with another system, even though an upper limit is set to the communication amount of the sensor network system, congestion may occur due to an increase of the communication amount of the other system. Once congestion has occurred on the communication network, it is difficult to eliminate the congestion by the congestion prevention technique described above.

An exemplary object of the present invention is to provide a sensor network system, a server device, a sensor data collection controlling method, a gateway device, and a program that solve the aforementioned problem, that is, a problem that it is difficult to eliminate congestion once it has occurred on the communication network.

A sensor network system according to an aspect of the present invention includes at least one gateway device that collects sensor data from at least one sensor device, and a server device connected with the gateway device over a communication network. The server device collects the sensor data from the gateway device over the communication network.

The server device includes a determination unit that determines the degree of congestion of the communication network on the basis of a difference between the time difference, between a transmission time and a reception time of the sensor data transmitted from the gateway device to the server device, and a communication period of time taken in a state where congestion does not occur, and a control unit that determines, among a plurality of the sensor devices, a sensor device from which the sensor data is collected and a sensor device in which collection of the sensor data is withheld, on the basis of the determination result of the degree of congestion of the communication network, and sends an instruction including the determined content to the gateway device.

A server device according to another aspect of the present invention is a server device connected with a gateway device over a communication network. The gateway device collects sensor data from a sensor device, and the server device collects the sensor data from the gateway device over the communication network. The server device includes a determination unit that determines the degree of congestion of the communication network on the basis of a difference between a time difference, between a transmission time and a reception time of the sensor data transmitted from the gateway device to the server device, and a communication period of time taken in a state where congestion does not occur, and a control unit that determines, among a plurality of the sensor devices, a sensor device from which the sensor data is collected and a sensor device in which collection of the sensor data is withheld, on the basis of the determination result of the degree of congestion of the communication network, and sends an instruction including the determined content to the gateway device.

Further, a gateway device according to another aspect of the present invention is a gateway device that collects sensor data from at least one sensor device and transmits the sensor data to a server device over a communication network. The gateway device includes a received data analysis unit that receives, from the server device over the communication network, and analyzes an instruction that identifies, among a plurality of the sensor devices, a sensor device from which the sensor data is collected and a sensor device in which collection of the sensor data is withheld, determined on the basis of the degree of congestion of the communication network, and a control unit that selects a unit of the sensor data to be transmitted to the server device, from among units of the sensor data of the sensor devices and creates transmission data, in accordance with the instruction.

A sensor data collection controlling method according to another aspect of the present invention is a method performed by a server device connected with a gateway device over a communication network. The gateway device collects sensor data from a sensor device, and the server device collects the sensor data from the gateway device over the communication network. The method includes determining the degree of congestion of the communication network on the basis of a difference between a time difference, between the transmission time and the reception time of the sensor data transmitted from the gateway device to the server device, and a communication period of time taken in a state where congestion does not occur, and determining, among a plurality of the sensor devices, a sensor device from which the sensor data is collected and a sensor device in which collection of the sensor data is withheld, on the basis of the determination result of the degree of congestion of the communication network, and sending an instruction including the determined content to the gateway device.

A program according to another aspect of the present invention is a program for causing a computer to function as, the computer being connected, over a communication network, with a gateway device that collects sensor data from a sensor device, and collecting the sensor data from the gateway device over the communication network, a determination unit that determines the degree of congestion of the communication network on the basis of a difference between a time difference, between the transmission time and the reception time of the sensor data transmitted from the gateway device to the server device, and a communication period of time taken in a state where congestion does not occur, and a transmission data control unit that determines, among a plurality of the sensor devices, a sensor device from which the sensor data is collected and a sensor device in which collection of the sensor data is withheld, on the basis of the determination result of the degree of congestion of the communication network, and sends an instruction including the determined content to the gateway device.

Since the present invention is configured as described above, when congestion occurs on the communication network connecting the gateway device and the server device, the congestion can be detected and eliminated.

BRIEF DESCRIPTION OF DRAWINGS

FIG. 2 is a diagram illustrating exemplary contents of a non-transmitted data list according to the first exemplary embodiment of the present invention.

FIG. 3 is a diagram illustrating exemplary contents of a sensor information list according to the first exemplary embodiment of the present invention.

FIG. 4 is a diagram illustrating exemplary contents of an edge communication information list according to the first exemplary embodiment of the present invention.

FIG. 13 is a diagram illustrating exemplary contents of an edge communication information list according to the fifth exemplary embodiment of the present invention.

EXEMPLARY EMBODIMENTS

First Exemplary Embodiment

Figure 1:
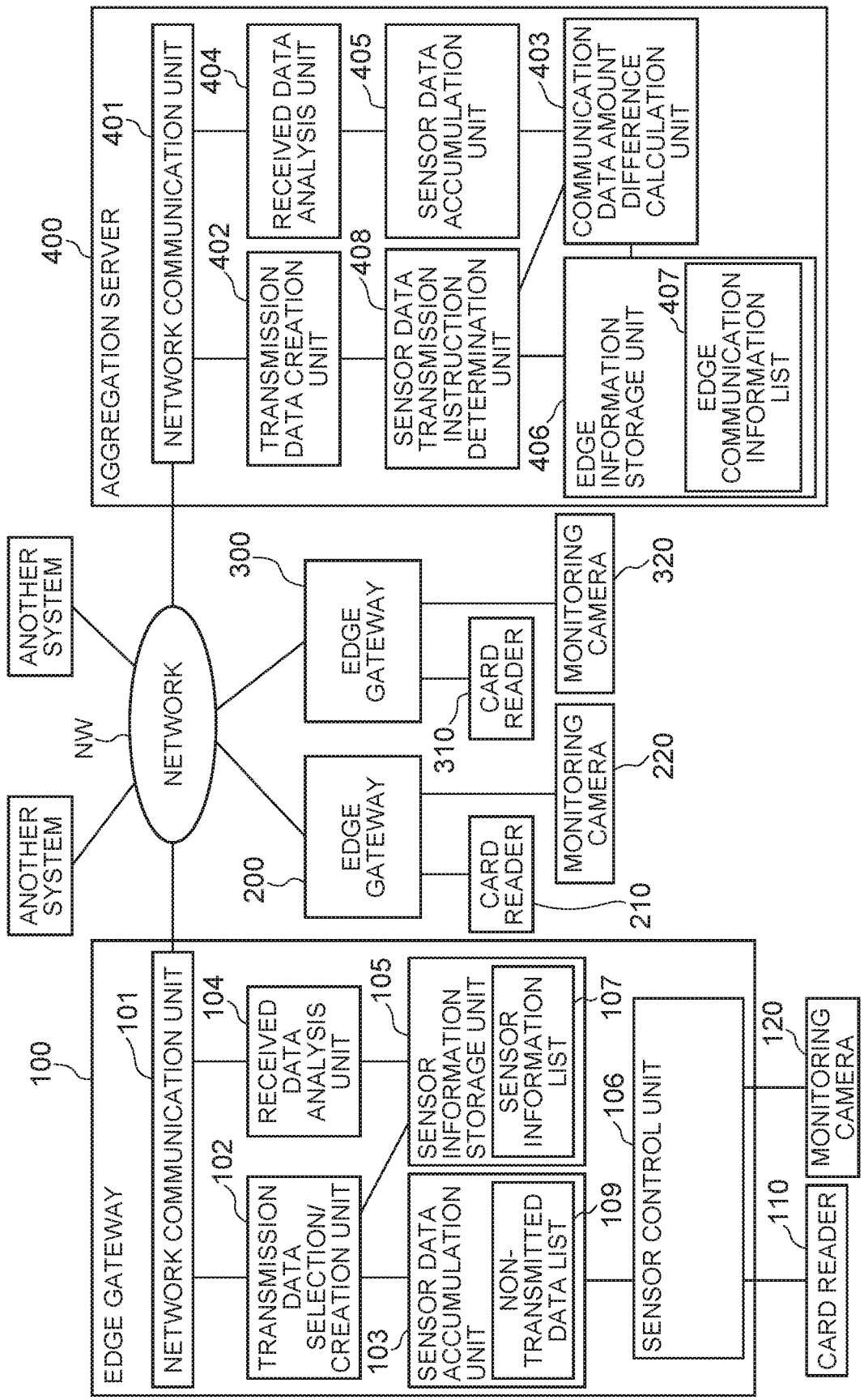
FIG. 1 is a block diagram of a sensor network system according to a first exemplary embodiment of the present invention.

Next, a first exemplary embodiment of the present invention will be described in detail with reference to the drawings.

Features of Present Embodiment

The present embodiment relates to a sensor network system in which sensor data of a sensor device provided at a remote place is collected by a server via an edge gateway. A server of the present embodiment estimates a congestion state of a communication network connecting an edge gateway and a server, from variations of the time taken for transmission and reception of sensor data transmitted from the edge gateway to the server. Then, the server instructs an edge gateway that performs communication causing an increase of the communication period of time, to suppress the communication amount in order to eliminate the congestion state of the communication network. The edge gateway that received the instruction stops transmission of data of the sensor device designated in the instruction, among the connected sensor devices. Alternatively, the edge gateway that received the instruction transmits only the data of the sensor device designated in the instruction, among the connected sensor devices.

As described above, in the present embodiment, the congestion state of the communication network used by the sensor network system is estimated in a simple manner. Also, in the present embodiment, the communication band used by the sensor network system is limited at the time of congestion. Thereby, the congestion state of the communication network is eliminated, and another system that uses the same network can use the communication network preferentially.

Problem to be Solved by Present Embodiment

Recently, the concept of IoT has spread, and our lifestyle is going to change drastically to be more convenient. This concept is to combine various types of sensors that have been used independently to thereby store and utilize states and conditions of places and things as data. In combination with technologies such as big data and artificial intelligence having developed at the same time as IoT, automation and optimization of various matters in the daily life are expected.

In the case of additionally introducing such an IoT system into the environment where an existing system operates, it is necessary that the introduced IoT system do not use the existing resources too much. Particularly, network resources largely affect other systems that share them. Additionally, in the IoT system, the transmission amount of sensor data tends to be increased when a sensor is added. Therefore, in the case where the IoT system and the existing system share network resources, it is necessary to properly manage the communication amount of the IoT system.

In particular, in a configuration in which a plurality of systems share one communication network, a problem of an increase of the communication period is often caused due to congestion on the network. With respect to this problem, a proposed method is that a server notifies a client that transmits data of a target value of the transmission rate, and the client limits the overall amount of transmission. Moreover, with respect to the problem, a method of limiting the amount by a network device that relays it is also proposed. However, with such solving methods, the overall transmission from the client is affected. This causes a problem of an increase of the communication period of data that cannot allow transmission delay.

Such a problem also exists in a sensor network system that is a type of IoT system in which sensor data is collected from one or more edge gateways connected with sensor devices and is stored in a remote server and utilized. In the case where such a sensor network system shares a communication network with another system, it is expected to have a scheme for preventing congestion while decreasing influences on the respective systems and enabling transmission and reception of data having high urgency and high importance preferentially.

Means for Solving by the Present Embodiment

In general, an increase of the communication period tends to be caused by congestion on the communication network. Therefore, in the present embodiment, a server calculates a period of time taken for communication from the difference between the transmission time and the reception time of data in the communication between it and the edge gateway. The calculated communication period varies depending on the congestion state of the communication network. The server compares the calculated communication period with the communication period when no congestion occurs on the communication network (previously set) to thereby determine whether or not congestion has occurred on the communication network.

In addition, from the difference between the period of time taken for communication and the communication period when no congestion occurs, the server calculates the amount of transmission data that should be reduced for restoring the communication state to the normal state when congestion has occurred on the communication network. Then, in order to reduce the data transmission amount by the calculated amount, the server issues an instruction to stop transmission of part of the sensor data, to the edge gateway. Thereby, the total amount of the sensor data transmitted from the edge gateway to the server is reduced, whereby congestion on the communication network is mitigated. As a result, congestion on the communication network is eliminated. In the case of an IoT system in which collection of part of sensor data does not need real time property, collection of sensor data that does not need real time property is intentionally delayed so as to contribute to elimination of congestion on the communication network. By applying such countermeasures to the edge gateway connected over the communication network, the server suppresses an effect placed on the communication network by the IoT system at the time of congestion.

Configuration of Present Embodiment

FIG. 1 is a block diagram of a sensor network system according to the first exemplary embodiment of the present invention. The sensor network system of the present embodiment is a system for collecting and accumulating videos of entering persons by providing a card reader and a monitoring camera at an appropriate location such as an entrance of an office building. In order to do so, the sensor network system of the present embodiment includes an edge gateway 100 connected with a card reader 110 and a monitoring camera 120, an edge gateway 200 connected with a card reader 210 and a monitoring camera 220, and an edge gateway 300 connected with a card reader 310 and a monitoring camera 320. The sensor network system 1 of the present embodiment also includes one aggregation server 400. The aggregation server 400 is connected with the three edge gateways 100, 200, and 300 over a network NW. Here, the network NW is not dedicated for the sensor network system but is shared with other systems. The other systems include a database system, a mail system, and a voice call system that are installed in the office building, for example, but are not limited thereto. Hereinafter, communication performed by another system over the network NW will be called communication in the office building. The use of the network NW is subject to a condition that the communication in the office building is in preference to the communication by the sensor network system.

The edge gateway 100 includes, as main functional units, a network communication unit 101, a transmission data selection/creation unit 102, a sensor data accumulation unit 103, a received data analysis unit 104, a sensor information storage unit 105, and a sensor control unit 106.

The sensor control unit 106 controls a card reader 110 and a monitoring camera 120 that are sensors. For example, when an employee ID card is held over the card reader 110, data of the employee ID card is read by the card reader 110 and is transmitted to the sensor control unit 106. The sensor control unit 106 receives the transmitted data of the employee ID card, and transfers it to the sensor data accumulation unit 103. Also, in order to acquire data of a face image or the like of the employee who held over the employee ID card, the sensor control unit 106 transmits an image acquisition request to the monitoring camera 120 in conjunction with reception of the data of the employee ID card. Further, when the monitoring camera 120 acquires data of a face image or the like of the employee in response to the acquisition request and transmits it, the sensor control unit 106 receives the data and transfers it to the sensor data accumulation unit 103.

The sensor data accumulation unit 103 records the sensor data, received from the sensor control unit 106, for each sensor and in the arrival order in a storage unit, and manages it. The sensor data accumulation unit 103 has a non-transmitted data list 109 that is management information of the accumulated sensor data.

FIG. 2 illustrates exemplary contents of non-transmitted data list 109. The non-transmitted data list 109 of this example has an entry corresponding one to one to a sensor. Each entry is configured of a sensor data name and the number of non-transmitted data units. For example, an entry on the first row of the non-transmitted data list 109 shows that the number of non-transmitted data units of the card reader 110 is zero. Further, an entry on the second row of the non-transmitted data list 109 shows that the number of non-transmitted data units of the monitoring camera 120 is zero. Each time the sensor data accumulation unit 103 receives data of one employee ID card from the card reader 110, the sensor data accumulation unit 103 increments the number of non-transmitted data units of the card reader 110 in the non-transmitted data list 109 by one. Further, each time the sensor data accumulation unit 103 receives data of one employee ID card from the monitoring camera 120, the sensor data accumulation unit 103 increments the number of non-transmitted data units of the monitoring camera in the non-transmitted data list 109 by one.

The sensor information storage unit 105 manages the sensor data name to be transmitted from the edge gateway 100 to the aggregation server 400 and the number of transmittable data units thereof. The sensor information storage unit 105 includes the sensor information list 107.

FIG. 3 illustrates exemplary contents of the sensor information list 107. The sensor information list 107 of this example has an entry corresponding one to one to a sensor. Each entry is configured of a sensor data name and the number of transmittable data units. For example, an entry on the first row of the sensor information list 107 shows that the number of transmittable data units of the card reader 110 is one. Further, an entry on the second row of the sensor information list 107 shows that the number of transmittable data units of the monitoring camera 120 is one. The sensor information storage unit 105 updates the number of transmittable data units in the sensor information list 107, in accordance with an instruction transmitted from the aggregation server 400 extracted by the received data analysis unit 104.

The transmission data selection/creation unit 102 creates data to be transmitted from the edge gateway 100 to the aggregation server 400. The transmission data selection/creation unit 102 determines the type and the number of sensor data to be included in the data to be transmitted to the aggregation server 400, with reference to the sensor information list 107. For example, when the sensor information list 107 has the contents as illustrated in FIG. 3, the transmission data selection/creation unit 102 includes one sensor data unit of the card reader 110 as its upper limit in the transmission data, and includes one sensor data unit of the monitoring camera 120 as its upper limit in the transmission data. The transmission data selection/creation unit 102 extracts sensor data units to be included in the transmission data from the sensor data accumulation unit 103 in the chronological order. Further, each time the transmission data selection/creation unit 102 extracts one sensor data unit from the sensor data accumulation unit 103, the transmission data selection creation unit 102 decrements the number of the non-transmitted data units in the non-transmitted data list 109 corresponding to the type of the selected sensor data unit. Moreover, the transmission data selection/creation unit 102 acquires the current time as a transmission time, creates a time stamp of the transmission time, and includes it in the transmission data.

The network communication unit 101 governs communication between the edge gateway 100 and the aggregation server 400. The network communication unit 101 transmits the transmission data created by the transmission data selection/creation unit 102 to the aggregation server 400 over the network NW. The network communication unit 101 also transfers the data received from the aggregation server 400 over the network NW to the received data analysis unit 104.

The received data analysis unit 104 analyzes the received data. The received data analysis unit 104 analyzes the received data, and when detects an instruction from the aggregation server 400, transfers the detected instruction to the sensor information storage unit 105. As described above, the sensor information storage unit 105 updates the number of transmittable data units in the sensor information list 107, in accordance with the instruction transferred from the received data analysis unit 104.

The edge gateways 200 and 300 have configurations similar to that of the edge gateway 100.

The aggregation server 400 includes, as main functional units, a network communication unit 401, a transmission data creation unit 402, a communication data amount difference calculation unit 403, a received data analysis unit 404, a sensor data accumulation unit 405, an edge information storage unit 406, and a sensor data transmission instruction determination unit 408.

The network communication unit 401 governs communication between the aggregation server 400 and the edge gateways 100, 200, and 300. The network communication unit 401 transmits the transmission data created by the transmission data creation unit 402 to the edge gateways 100, 200, and 300 over the network NW. When the network communication unit 401 receives data from the edge gateways 100, 200, and 300 over the network NW, the network communication unit 401 acquires the current time as a reception time, creates a time stamp of the reception time, and transfers the received data and the time stamp of the reception time to the received data analysis unit 404. Here, the network communication unit 401 sets the reception time to the time when the aggregation server 400 receives the leading frame that includes the time stamp of the transmission time of the sensor data from the edge gateway, for example.

The received data analysis unit 404 analyzes the received data from the edge gateways 100, 200, and 300. When the received data analysis unit 404 analyzes the received data from the edge gateways 100, 200, and 300 and detects sensor data and the time stamp of the transmission time, the received data analysis unit 404 transfers them and the time stamp of the reception time generated by the network communication unit 401 to the sensor data accumulation unit 405.

The sensor data accumulation unit 405 stores, in the storage unit, the sensor data from the edge gateways 100, 200, and 300, the time stamp of the transmission time, and the time stamp of the reception time, received from the received data analysis unit 404, for each edge gateway. Also, the sensor data accumulation unit 405 transfers the sensor data, the time stamp of the transmission time, and the time stamp of the reception time, received from the received data analysis unit 404, to the communication data amount difference calculation unit 403, for each edge gateway.

The edge information storage unit 406 manages information related to sensor data that should be collected from the edge gateway. The edge information storage unit 406 includes an edge communication information list 407.

FIG. 4 illustrates exemplary contents of the edge communication information list 407. The edge communication information list 407 of this example has an entry corresponding one to one to a sensor, and each entry is configured of an edge gateway name, a sensor data name, priority, average data size, average transmission period, and the number of transmittable data units. For example, an entry on the first row of the edge communication information list 407 represents that the priority of the card reader 110 of the edge gateway 100 is "intermediate", the average data size of the sensor data is 10 bytes, the average transmission period is 0.00001 ms, and the number of transmittable data units is one. Further, an entry on the second row of the edge communication information list 407 represents that the priority of the monitoring camera 120 of the edge gateway 100 is "intermediate", the average data size of the sensor data is 1 Mbytes, the average transmission period is 10 s, and the number of transmittable data units is one. Here, the average transmission period represents a communication period of time taken for transmitting sensor data of the average data size from the edge gateway 100 to the aggregation server 400 in a time period in which the communication network is free. The edge gateway name, the sensor data name, the priority, the average data size, and the average transmission period in the edge communication information list 407 are initially set before starting operation of the sensor network system. As shown in the example of average data size, the sensor data amount of a card reader is sufficiently smaller compared with the sensor data mount of a monitoring camera. The number of transmittable data units in the edge communication information list 407 is dynamically updated by the sensor data transmission instruction determination unit 408 during operation of the sensor network system.

The communication data amount difference calculation unit 403 performs processing as described below for each of the edge gateways 100, 200, and 300. First, from the time stamp of the transmission time included in the received data from the edge gateway, received from the sensor data accumulation unit 405, and the time stamp of the reception time acquired by the network communication unit 401, the communication data amount difference calculation unit 403 calculates a communication period t taken for transmission of the received data. That is, the communication period t is given by the following expression, where $t_r$ represents the reception time and $t_s$ represents the transmission time:

$$t = t_r - t_s \quad (1)$$

Then, from a size D of the received data and the communication period t, the communication data amount difference calculation unit 403 calculates a transmission rate S between the edge gateway and the aggregation server 400 by the following expression:

$$S = D/t \quad (2)$$

The transmission rate S represents a maximum transfer amount per unit time.

Then, the communication data amount difference calculation unit 403 acquires, from the edge communication information list 407, an average transmission period taken for transmission of sensor data from the edge gateway in the time period in which the communication network is free, and calculates the communication amount that can be transmitted in the average transmission period at the current transmission rate S. Here, the communication amount $CD_s$ of the sensor data of the card reader that can be transmitted in the average transmission period at the current transmission rate S and the communication amount $PD_s$ of the sensor data of the monitoring camera are given by the following expressions respectively, where $t_c$ represents the average transmission period taken for transmission of the sensor data of the card reader from the edge gateway in a time period in which the communication network is free, and $t_p$ represents the average transmission period taken for transmission of the sensor data of the monitoring camera:

$$CD_s = S \times t_c \quad (3)$$

$$PD_s = S \times t_p \quad (4)$$

Accordingly, the total communication amount $WD_s$ of sensor data of the card reader and the monitoring camera that can be transmitted in the average transmission period at the current transmission rate S is given by the following expression:

$$WD_s = CD_s + PD_s \quad (5)$$

Then, the communication data amount difference calculation unit 403 calculates the data amount obtained by subtracting the currently received data amount from the communication amount $WD_s$ that can be transmitted in the average transmission period at the current transmission rate S, as a surplus DF of the communication data amount. The surplus DF of the communication data amount takes a value of zero or a positive value in a state where the communication network is free. Meanwhile, the surplus DF of the communication data amount takes a negative value in a state where the communication network is congested.

The communication data amount difference calculation unit 403 transfers the surplus DF of the communication data according to the edge gateway, to the sensor data transmission instruction determination unit 408.

The sensor data transmission instruction determination unit 408 determines an instruction including sensor data allowed to be transmitted and the number of transmittable data units thereof and sensor data prohibited from being transmitted, to the edge gateways 100, 200, and 300. When the sensor data transmission instruction determination unit 408 receives a surplus of the communication data according to an edge gateway from the communication data amount difference calculation unit 403, the data transmission instruction determination unit 408 performs processing as described below.

First, the sensor data transmission instruction determination unit 408 determines whether or not the surplus of the communication data is equal to or larger than zero, or less than zero. When the surplus of the communication data is equal to or larger than zero, the communication network from the edge gateway to the aggregation server 400 is free. Therefore, the sensor data transmission instruction determination unit 408 determines whether to keep the communication amount at the current level or to be able to increase it. On the other hand, when the surplus of the communication data is less than zero, the communication network from the edge gateway to the aggregation server 400 is congested. Therefore, the sensor data transmission instruction determination unit 408 determines that the communication amount must be decreased from the current level.

In the case of keeping the communication amount at the current level, the sensor data transmission instruction determination unit 408 creates an instruction by using the number of transmittable data units of each type of sensor data recorded on the edge communication information list 407 for the edge gateway.

Meanwhile, in the case of decreasing the communication amount from the current level, the sensor data transmission instruction determination unit 408 performs update to decrement the number of transmittable data units of sensor data recorded on the edge communication information list 407 of the edge gateway by at least one, and creates an instruction by using the number of transmittable data units of the sensor data recorded on the edge communication information list 407 after the update. The sensor data transmission instruction determination unit 408 determines the sensor data in which the number of transmittable data units is to be decremented as described below, for example.

First, the sensor data transmission instruction determination unit 408 checks the number of transmittable data units of the sensor data of the edge gateway from the edge communication information list 407. Then, the sensor data transmission instruction determination unit 408 determines the sensor data in which the number of transmittable data units is to be decremented, from the sensor data in which the number of transmittable data units is one or larger. At that time, the sensor data transmission instruction determination unit 408 determines the sensor data in which the number of transmittable data units is to be decremented, in consideration of at least one of the priority, the average data size, the number of transmittable data units, and the surplus amount. For example, in the case where a plurality of types of sensor data in each of which the number of transmittable data units is one or larger have different priorities, the sensor data transmission instruction determination unit 408 decrements the number of transmittable data units of the sensor data having the lowest priority, by a certain number of data units. Alternatively, in the case where a plurality of types of sensor data in which the number of transmittable data units is one or larger have the same priority, the sensor data transmission instruction determination unit 408 decrements the number of transmittable data units of the sensor data having an average data size that is closest to the absolute value of the surplus of the sensor data amount. Alternatively, the sensor data transmission instruction determination unit 408 decrements, by one, the number of transmittable data units of sensor data that can be reduced by the data amount that almost coincides with the absolute value of the surplus of the sensor data amount, in order from that having lower priority.

Meanwhile, in the case of increasing the communication amount from the current level, the sensor data transmission instruction determination unit 408 performs update to increment, by one, the number of transmittable data units of at least one type of sensor data recorded on the edge communication information list 407 of the edge gateway, and creates an instruction by using the number of transmittable data units of the respective types of sensor data recorded on the edge communication information list 407 after the update. The sensor data transmission instruction determination unit 408 determines the type of sensor data in which the number of transmittable data units is to be incremented as described below, for example.

First, the sensor data transmission instruction determination unit 408 checks the number of transmittable data units of each type of sensor data of the edge gateway from the edge communication information list 407. Then, the sensor data transmission instruction determination unit 408 determines the type of sensor data in which the number of transmittable data units is to be incremented, from among the types of sensor data in which the number of transmittable data units is zero (if there is no such type of sensor data, sensor data in which the number of transmittable data units is equal to less than a threshold such as "1"). At that time, the sensor data transmission instruction determination unit 408 determines the type of sensor data in which the number of transmittable data units is to be incremented in consideration of at least one of priority, average data size, the number of transmittable data units, and the surplus amount, of the sensor data. For example, in the case where a plurality of types of sensor data have different priorities, the sensor data transmission instruction determination unit 408 increments the number of transmittable data units of a type of sensor data having the highest priority, by a certain number. Alternatively, in the case where a plurality of types of sensor data have the same priority, the sensor data transmission instruction determination unit 408 increments, by one, the number of transmittable data units of a type of sensor data, among them, having an average data size that is closest to the absolute value of the surplus of the sensor data amount. Alternatively, the sensor data transmission instruction determination unit 408 increments, by one, the number of transmittable data units of a type of sensor data that can be increased by the data amount that almost coincides with the absolute value of the surplus of the sensor data amount, in order from that having the highest priority.

The transmission data creation unit 402 creates transmission data including an instruction to the edge gateway 100, 200, or 300 received from the sensor data transmission instruction determination unit 408, and transfers it to the network communication unit 401. The transmission data is created as a response to the sensor data received from the edge gateway 100, 200, or 300.

Figure 5:
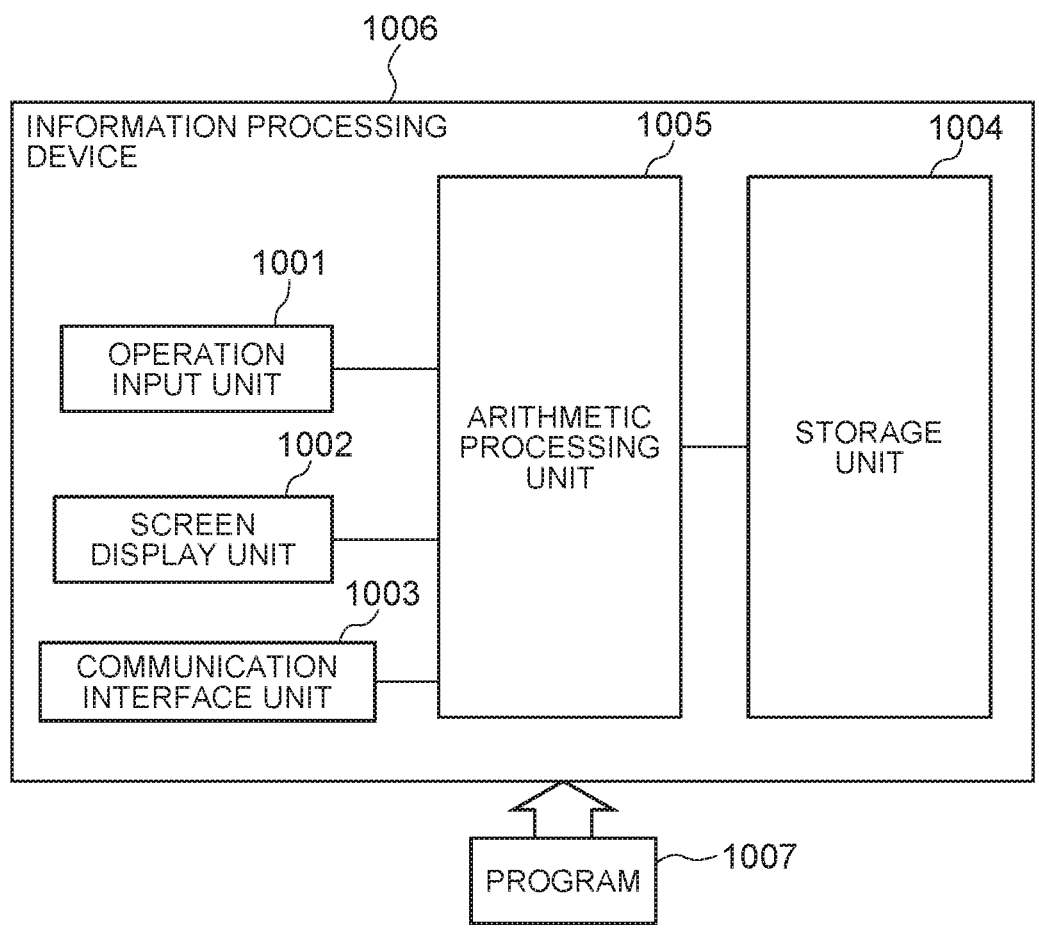
FIG. 5 is a block diagram illustrating an example of a hardware configuration of an edge gateway and an aggregation server according to the first exemplary embodiment of the present invention.

Each of the edge gateways 100, 200, and 300 and the aggregation server 400 can be implemented by an information processing device 1006 such as a personal computer having an operation input unit 1001 including a keyboard and a mouse, a screen display unit 1002 such as a liquid crystal display, a communication interface unit 1003, a storage unit 1004 including a memory and a hard disk, at least one arithmetic processing unit 1005 such as a microprocessor, and a program 1007, as illustrated in FIG. 5.

The program 1007 is read from an external computer-readable storage medium into the memory when the information processing device 1006 is started or the like, and controls operation of the arithmetic processing unit 1005. Thereby, in the edge gateways 100, 200, and 300, the program 1007 implements, on the arithmetic processing unit 1005, functional means such as the network communication unit 101, the transmission data selection/creation unit 102, the sensor data accumulation unit 103, the received data analysis unit 104, the sensor information storage unit 105, and the sensor control unit 106. In the aggregation server 400, the program 1007 also implements functional means such as the network communication unit 401, the transmission data creation unit 402, the communication data amount difference calculation unit 403, the received data analysis unit 404, the sensor data accumulation unit 405, the edge information storage unit 406, and the sensor data transmission instruction determination unit 408.

Operation of Present Embodiment

Next, operation of the present embodiment will be described.

Figure 6:
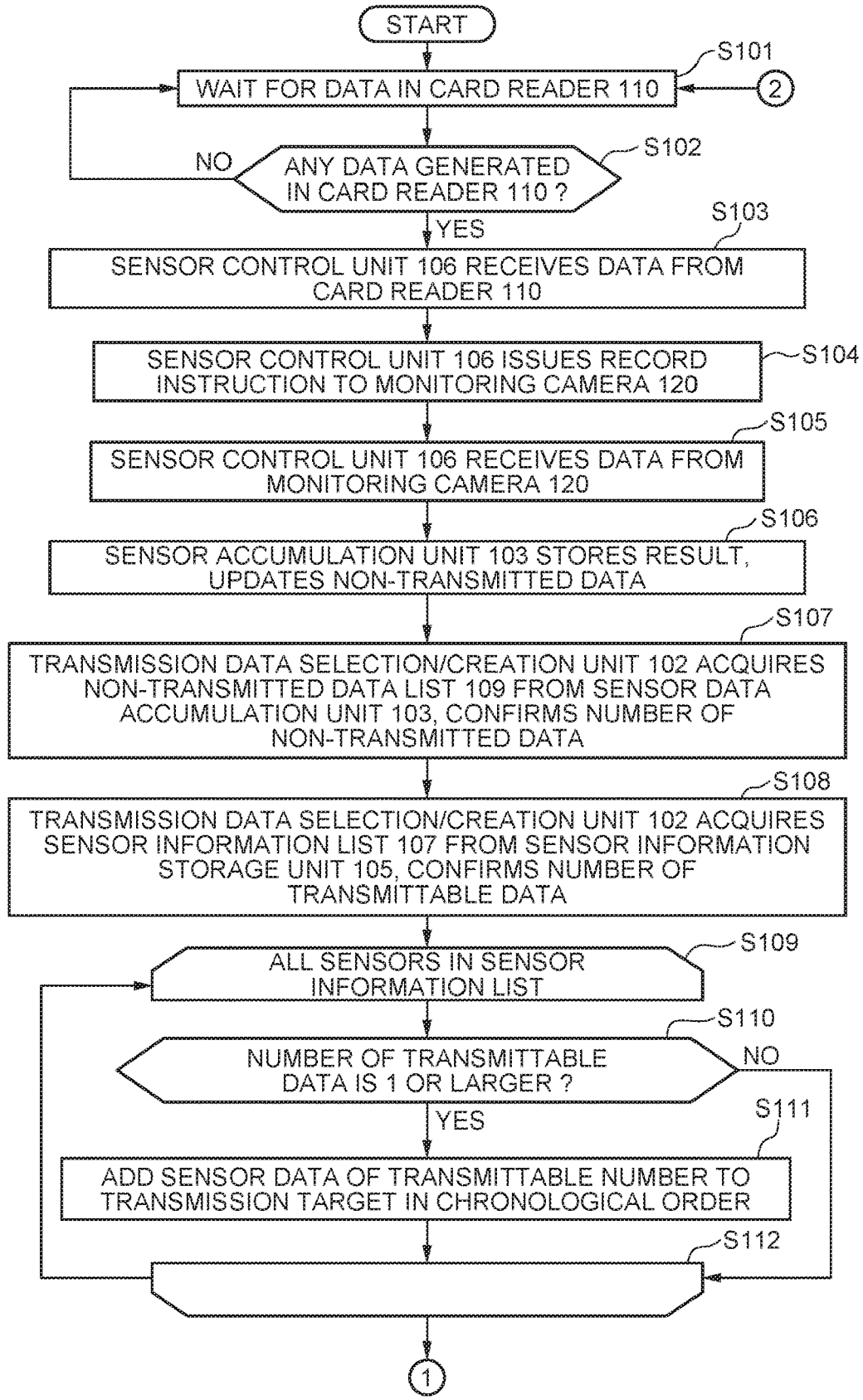
FIG. 6 is a flowchart illustrating an exemplary operation of the edge gateway according to the first exemplary embodiment of the present invention.
Figure 7:
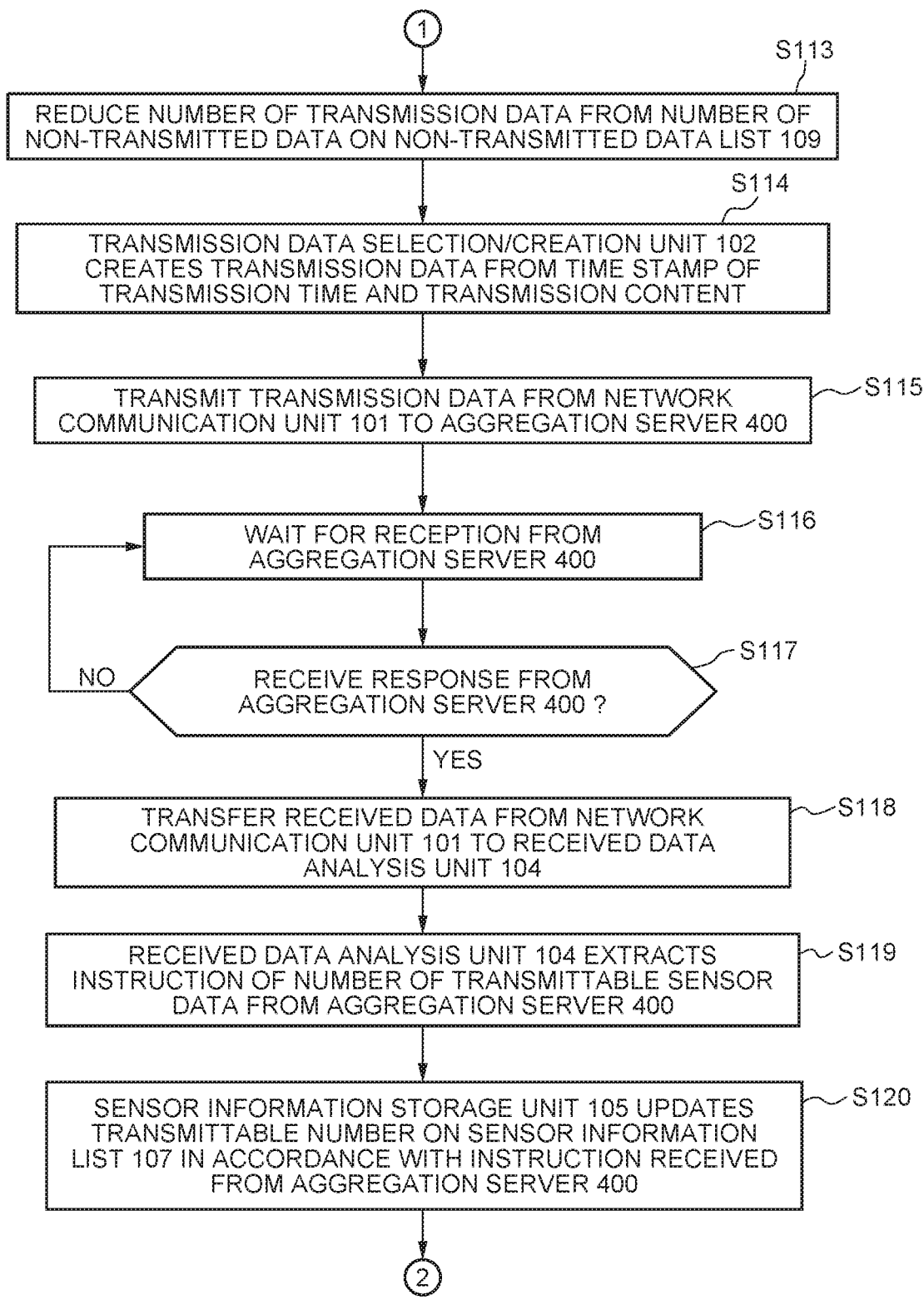
FIG. 7 is a flowchart illustrating an exemplary operation of the edge gateway according to the first exemplary embodiment of the present invention.

First, operation of the edge gateways 100, 200, and 300 will described. FIGS. 6 and 7 are flowcharts illustrating an exemplary operation of the edge gateway 100. Hereinafter, operation of the edge gateway 100 will be described with reference to FIGS. 6 and 7. Note that operation of the edge gateways 200 and 300 is the same as that of the edge gateway 100.

Figure 8:
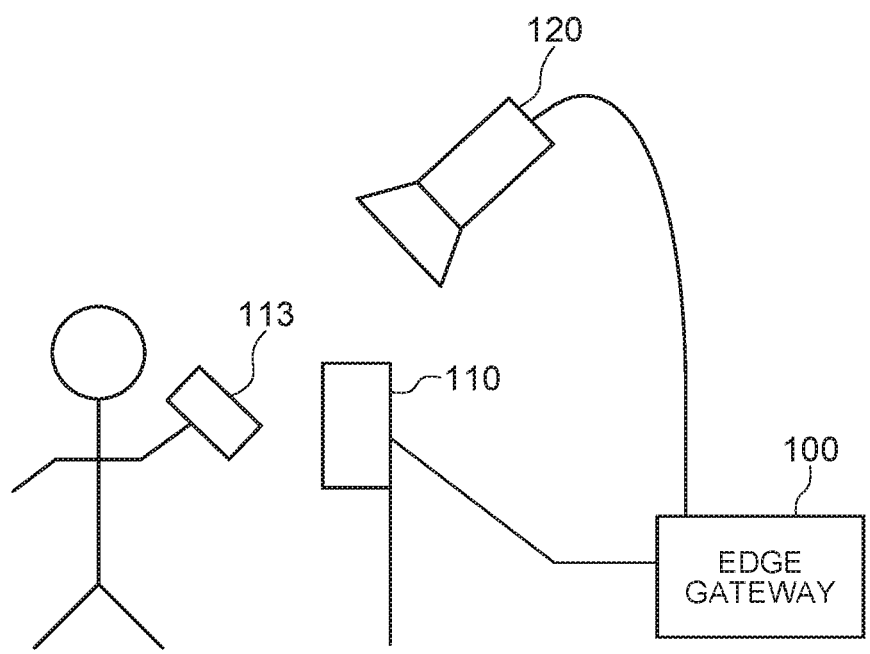
FIG. 8 is a diagram illustrating an example of acquisition of sensor data by a card reader and a monitoring camera according to the first exemplary embodiment of the present invention.

The sensor control unit 106 of the edge gateway 100 first allows the card reader 110 to be in a standby state (step S101). Then, the sensor control unit 106 determines whether or not data is generated in the card reader 110 (step S102). For example, as illustrated in FIG. 8, when an employee ID card 113 is held over the card reader 110, information of the employee ID card 113 is read by the card reader 110 and data is generated. When no data is generated in the card reader 110, the sensor control unit 106 still allows the card reader 110 to be in the standby state (step S101).

On the contrary, when data is generated in the card reader 110, the sensor control unit 106 receives the data from the card reader 110 (step S103). Then, the sensor control unit 106 issues a record instruction to the monitoring camera 120 (step S104). When a record instruction is issued, the monitoring camera 120 acquires and records image data of the employee who passes through the card reader 110, as illustrated in FIG. 8. Then, the sensor control unit 106 receives the recorded data from the monitoring camera 120 (step S105).

Then, the sensor data accumulation unit 103 receives the data of the card reader 110 and the data of the monitoring camera 120 from the sensor control unit 106 and accumulates them, and updates the non-transmitted data list 109 (step S106). That is, the sensor data accumulation unit 103 increments each of the number of non-transmitted data units of the card reader 110 and the number of non-transmitted data units of the monitoring camera 120, recorded on the non-transmitted data list 109, by one.

Then, the transmission data selection/creation unit 102 acquires the non-transmitted data list 109 from the sensor data accumulation unit 103, and checks the number of non-transmitted data units of each of the card reader 110 and the monitoring camera 120 (step S107). The transmission data selection/creation unit 102 also acquires the sensor information list 107 from the sensor information storage unit 105, and checks the number of transmittable data units of each of the card reader 110 and the monitoring camera 120 (step S108). Then, with respect to all of the sensors (that is, the card reader 110 and the monitoring camera 120), when the number of transmittable data units is one or larger, the transmission data selection/creation unit 102 extracts the number of transmittable data units of sensor data from the sensor data accumulated in the sensor data accumulation unit 103 in the chronological order, and adds them to the transmission target (steps S109 to S112). Then, with respect to all of the sensors, the transmission data selection/creation unit 102 decrements the number of non-transmitted data units recorded on the non-transmitted data list 109 by the number added to the transmission target (step S113). Then, the transmission data selection/creation unit 102 creates transmission data from the time stamp of the current time (time stamp of the transmission time) and the transmission target (step S114).

Then, the network communication unit 101 transmits the transmission data created by the transmission data selection/creation unit 102 to the aggregation server 400 over communication network of the network NW (step S115). Then, the network communication unit 101 waits for a response from the aggregation server 400 (step S116, S117). Then, upon receipt of a response from the aggregation server 400, the network communication unit 101 transfers the received data to the received data analysis unit 104 (step S118).

The received data analysis unit 104 extracts, from the received data, an instruction of the number of transmittable data units of the sensor data from the aggregation server 400 (step S119). Then, the sensor information storage unit 105 updates the value of the number of transmittable data units on the sensor information list 107, in accordance with the instruction extracted by the received data analysis unit 104 (step S120). Then, the edge gateway 100 returns to the processing of step S101.

Figure 9:
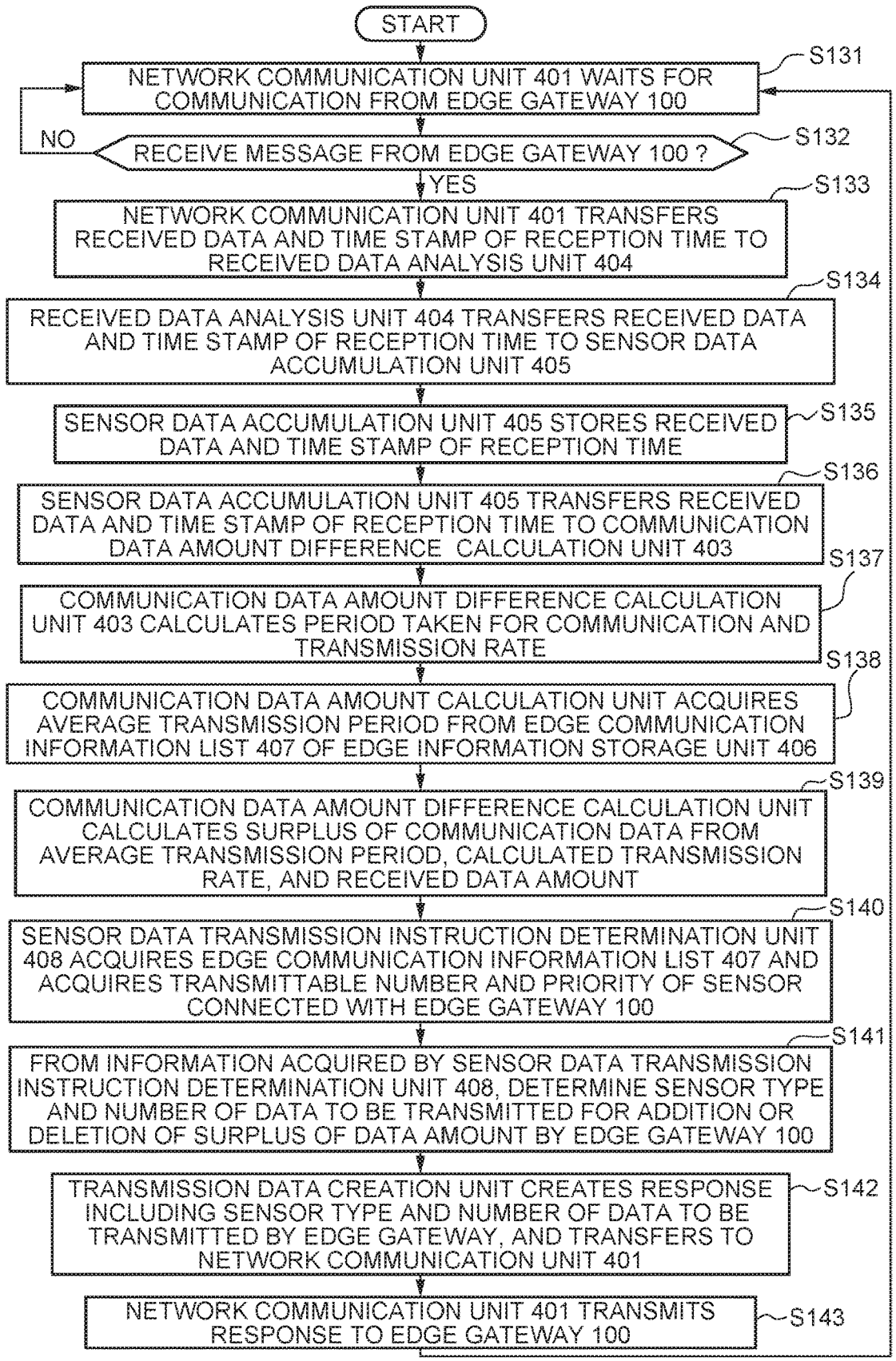
FIG. 9 is a flowchart illustrating an exemplary operation of the aggregation server according to the first exemplary embodiment of the present invention.

Next, operation of the aggregation server 400 will be described. FIG. 9 is a flowchart illustrating an exemplary operation of the aggregation server 400 performed on the edge gateway 100. Hereinafter, operation of the aggregation server 400 performed on the edge gateway 100 will be described with reference to FIG. 9. Note that operation of the aggregation server 400 performed on the edge gateways 200 and 300 is the same as that performed on the edge gateway 100.

The network communication unit 401 of the aggregation server 400 waits for a message from the edge gateway 100 (steps S131, S132). Upon receipt of a message from the edge gateway 100, the network communication unit 401 creates a time stamp of the reception time, and transfers the received data and the time stamp of the reception time to the received data analysis unit 404 (step S133). The received data analysis unit 404 analyzes the received data transferred thereto and extracts the sensor data and the time stamp of the transmission time, and transfers them and the time stamp of the reception time to the sensor data accumulation unit 405 (step S134). The sensor data accumulation unit 405 stores the received sensor data, the time stamp of the transmission time, and the time stamp of the reception time, in the storage device (step S135). Then, the sensor data accumulation unit 405 transfers the stored sensor data, the time stamp of the transmission time, and the time stamp of the reception time, to the communication data amount difference calculation unit 403 (step S136).

The communication data amount difference calculation unit 403 calculates a period of time taken for the communication and the transmission rate, on the basis of the transferred sensor data, the time stamp of the transmission time, and the time stamp of the reception time (step S137). The communication data amount difference calculation unit 403 calculates the difference between the time stamp of the reception time and the time stamp of the transmission time as a period of time taken for the communication. The communication data amount difference calculation unit 403 also calculates the transmission rate from the size of the received data and the calculated communication period. Then, the communication data amount difference calculation unit 403 acquires, from the edge communication information list 407 of the edge information storage unit 406, a period of time taken for transmission of sensor data (average transmission period) from the edge gateway 100 in the time period in which the communication network is free (step S138). Then, the communication data amount difference calculation unit 403 calculates the surplus of the communication data from the acquired average transmission period, the transmission rate calculated at step S137, and the received data amount (step S139).

Then, the sensor data transmission instruction determination unit 408 acquires the edge communication information list 407 to acquire priority, average data size, and the number of transmittable data units of a sensor connected with the edge gateway 100 (step S140). Then, on the basis of the acquired information, the sensor data transmission instruction determination unit 408 determines an instruction including the type of sensor and the number of transmittable data units that the edge gateway 100 should transmit, in order to add or delete the surplus of the data amount by the edge gateway 100 (step S141). Then, the transmission data creation unit 402 creates a response including the instruction determined by the sensor data transmission instruction determination unit 408, and transfers it to the network communication unit 401 (step S142). Then, the network communication unit 401 transmits the created response to the edge gateway 100 over the communication network of the network NW (step S143).

Next, operation of the present embodiment will be described more specifically. It is assumed that communication performed with use of the communication network of the network NW by the existing system in an office building reaches the peak from 9:00 to 17:00, and the communication network is not used substantially in other time periods.

(A) First, description will be given on an operation when an employee working at the office building passes through the card reader 110 at 8:30 AM.

(1) When an employee holds the employee ID card 113 over the card reader 110, the card reader 110 reads the employee ID card and transmits the data to the sensor control unit 106.

(2) The sensor control unit 106 issues a record instruction to the monitoring camera 120, and receives image data of the employee captured by the camera 120 as a result. The sensor control unit 106 transfers the sensor data received from the card reader 110 and the sensor data received from the monitoring camera 120 to the sensor data accumulation unit 103.

(3) The sensor data accumulation unit 103 stores the two types of sensor data, and increments the number of non-transmitted data units of each sensor on the non-transmitted data list 109 by one. Then, the sensor data accumulation unit 103 requests the transmission data selection/creation unit 102 to transmit the sensor data.

(4) The transmission data selection/creation unit 102 receives the non-transmitted data list 109 from the sensor data accumulation unit 103, receives the sensor information list 107 from the sensor information storage unit 105, and checks the number of transmittable data units for every sensor data. Then, the transmission data selection/creation unit 102 selects sensor data units on the non-transmitted data list 109 for the number of transmittable data units in the chronological order, and acquires the time stamp of the current point of time as a time stamp of the transmission time, to thereby create transmission data. The transmission data selection/creation unit 102 transfers it to the network communication unit 101 and requests for transmission. The transmission data selection/creation unit 102 also subtracts the number of data units determined to be transmitted from the number of non-transmitted data units recorded on the non-transmitted data list 109 of the sensor data accumulation unit 103, and updates it.

(5) The network communication unit 101 transmits the transmission data to the aggregation server 400 over the network NW.

(6) The network communication unit 401 of the aggregation server receives the data, and transfers the received data and the time stamp of the reception time to the received data analysis unit 404.

(7) The received data analysis unit 404 confirms that the sensor data and the time stamp of the transmission time are included in the received data, and requests the sensor data accumulation unit 405 to store the sensor data, the time stamp of the transmission time, and the time stamp of the reception time.

(8) The sensor data accumulation unit 405 stores the sensor data, the time stamp of the transmission time, and the time stamp of the reception time, and transfers them to the communication data amount difference calculation unit 403.

(9) The communication data amount difference calculation unit 403 calculates a communication period taken for transmission of data, from the time stamp of the transmission time and the time stamp of the reception time. The communication data amount difference calculation unit 403 also calculates the transmission rate between the edge gateway 100 and the aggregation server 400, from the calculated communication period and the received data size. Then, the communication data amount difference calculation unit 403 acquires, from the edge communication information list 407 of the edge information storage unit 406, a period of time taken for transmission of the sensor data from the edge gateway 100 (average transmission period) in the time period in which the communication network is free, and calculates the communication amount that is transmittable in the average transmission period at the current transmission rate. Then, the communication data amount difference calculation unit 403 calculates the difference between the currently received data amount and the transmittable communication amount as a surplus of the communication data amount. In this case, since the network is free, the surplus takes a value of zero or a positive value. Description will be given below on the assumption that the surplus is almost zero. The communication data amount difference calculation unit 403 transfers the surplus to the sensor data transmission instruction determination unit 408.

(10) The sensor data transmission instruction determination unit 408 acquires the edge communication information list 407 of the edge information storage unit 406, and confirms that the priority of both the card reader 110 and the monitoring camera 120 connected with the edge gateway 100 is "intermediate", and that the number of transmittable data units thereof is one. The sensor data transmission instruction determination unit 408 also confirms that the surplus of the communication data amount received from the communication data amount difference calculation unit 403 is almost zero. Then, on the basis of the confirmation, the sensor data transmission instruction determination unit 408 determines that the card reader 110 and the monitoring camera 120 are able to perform transmission continuously, and transfers an instruction that the number of transmittable data units of the card reader 110 is one and the number of transmittable data units of the monitoring camera is one, to the transmission data creation unit 402.

(11) The transmission data creation unit 402 creates a response including the instruction from the sensor data transmission instruction determination unit 408 to the edge gateway 100, and transfers it to the network communication unit 401.

(12) The network communication unit 401 transmits the created response to the edge gateway 100 over the network NW.

(13) The network communication unit 101 of the edge gateway 100 receives the response, and transfers it to the received data analysis unit 104.

(14) The received data analysis unit 104 confirms that the instruction from the aggregation server 400 is that the number of transmittable data units of the card reader 110 is one and the number of transmittable data units of the monitoring camera 120 is one, and transfers the instruction to the sensor information storage unit 105.

(15) The sensor information storage unit 105 updates the respective rows of the number of transmittable data units on the sensor information list 107 to one and one, on the basis of the instruction from the aggregation server 400 transferred by the received data analysis unit 104, and ends the processing.

(B) Next, description will be given on an operation when an employee who works at the office building passes through the card reader 110 again at 9:00 AM.

(16) First, an operation similar to that of steps (1) to (8) of (A) is performed.

(17) The communication data amount difference calculation unit 403 calculates a period of time taken for transmission of the data, from the time stamp of the transmission time in the received data and the time stamp of the reception time acquired by the network communication unit 401. The communication data amount difference calculation unit 403 also calculates the transmission rate between the edge gateway 100 and the aggregation server 400, from the calculated communication period and the received data size. Then, the communication data amount difference calculation unit 403 acquires, from the edge communication information list 407 of the edge information storage unit 406, a period of time taken for transmission of the sensor data from the edge gateway 100 (average transmission period) in the time period in which the communication network is free, and calculates the communication amount that can be transmitted in the average transmission period at the current transmission rate. Then, the communication data amount difference calculation unit 403 calculates the difference between the currently received data amount and the transmittable communication amount as a surplus of the communication data amount. In this case, it is assumed that since the network is getting congested, a long period of time is required for communication and that the surplus takes a negative value. The communication data amount difference calculation unit 403 transfers the surplus to the sensor data transmission instruction determination unit 408.

(18) The sensor data transmission instruction determination unit 408 acquires the edge communication information list 407 of the edge information storage unit 406, and confirms that the number of transmittable data units of both the card reader 110 and the monitoring camera 120 connected with the edge gateway 100 is one. The sensor data transmission instruction determination unit 408 also confirms that the surplus of the communication data amount received from the communication data amount difference calculation unit 403 takes a negative value. Then, from the average data size of each of the card reader 110 and the monitoring camera 120, the sensor data transmission instruction determination unit 408 determines that the surplus of the communication data amount can be satisfied if the data of the monitoring camera 120 is not transmitted, and updates the number of transmittable data units of the monitoring camera 120 on the edge communication information list 407 by decrementing it by one to zero. Then, the sensor data transmission instruction determination unit 408 transfers an instruction that the number of transmittable data units of the card reader 110 is one and the number of transmittable data units of the monitoring camera 120 is zero, to the transmission data creation unit 402.

(19) The transmission data creation unit 402 creates a response including the instruction to the edge gateway 100, and transfers it to the network communication unit 401.

(20) The network communication unit 401 transmits the transferred response to the edge gateway 100 over the network NW.

(21) The network communication unit 101 of the edge gateway 100 receives the response, and transfers it to the received data analysis unit 104.

(22) The received data analysis unit 104 confirms that the instruction from the aggregation server 400 is that the number of transmittable data units of the card reader 110 is one and the number of transmittable data units of the monitoring camera 120 is zero, and transfers the instruction to the sensor information storage unit 105.

(23) The sensor information storage unit 105 updates the row of the number of transmittable data units of the monitoring camera 120 recorded on the sensor information list 107 to zero, on the basis of the instruction from the server transferred from the received data analysis unit 104, and ends the processing.

(24) Steps (16) to (23) are repeated. However, at step (4), since the number of transmittable data units of the monitoring camera 120 recorded on the sensor information list 107 is zero, the transmission data selection/creation unit 102 creates transmission data not including the sensor data of the monitoring camera 120. As a result, the number of non-transmitted data units of the monitoring camera 120 recorded on the non-transmitted data list 109 of the sensor data accumulation unit 103 is incremented by one as new sensor data of the monitoring camera 120 is accumulated because data is not transmitted.

Next, description will be given on an operation when an employee who works at an office building passes through the card reader 110 again at 18:00.

(25) Steps (1) to (15) are repeated. However, in the calculation at step (9), the communication network becomes free again and, since the current transmission data amount is small, the value of surplus becomes a large positive value. Therefore, at step (10), in the instruction transferred to the edge gateway 100 created by the sensor data transmission instruction determination unit 408, the number of transmittable data units of the card reader 110 is one and the number of transmittable data units of the monitoring camera 120 is two, for example.

(26) As a result, at step (15), the sensor information storage unit 105 updates the number of transmittable data units of the monitoring camera 120, recorded on the sensor information list 107, to two.

(27) Accordingly, at the next transmission timing of sensor data, at step (4), the transmission data selection/creation unit 102 selects one non-transmitted data unit of the card reader 110, and selects two non-transmitted data units of the monitoring camera 120 in the chronological order. Consequently, transmission data including one sensor data unit of the card reader 110 and two sensor data units of the monitoring camera 120 is transmitted from the edge gateway 100 to the aggregation server 400.

(28) Steps (1) to (15) are repeated.

Through these steps, by changing the communication band used by the sensor network system depending on the congestion state of the communication network, it is possible to allow another system to perform communication preferentially. In the sensor network system, collection of some sensor data does not need real-time property as in the case of the monitoring camera 120 in above-described example. Therefore, by delaying collection of such data appropriately, congestion on the communication network is mitigated.

Effect of the Present Embodiment

According to the present embodiment, when congestion occurs on the communication network connecting the edge gateways 100, 200, and 300 and the aggregation server 400, it is possible to detect and solve it. The reason is that the aggregation server 400 calculates the surplus of the communication data that is an index of a congestion state of the communication network, and when the communication network becomes a congestion state in which the surplus takes a negative value, an instruction to reduce the number of transmittable data units of sensor data is created to reduce the sensor data amount to be collected, and transmitted to the edge gateways 100, 200, and 300.

Further, according to the present embodiment, it is possible to allow another system that shares the communication network to use the communication network preferentially, depending on the congestion state of the communication network. This is because the sensor network system increases or decreases the band width to be used, depending on the congestion state of the communication network.

Furthermore, according to the present embodiment, a larger amount of non-transmitted data can be transmitted collectively when the communication network is free. The reason is that the aggregation server 400 calculates the surplus of the communication data that is an index of a congestion state of the communication network, and when the communication network becomes a free state in which the surplus takes a positive value, an instruction to increase the number of transmittable data units of sensor data is created to increase the sensor data amount to be collected, and is transmitted to the edge gateways 100, 200, and 300.

Second Exemplary Embodiment

Figure 10:
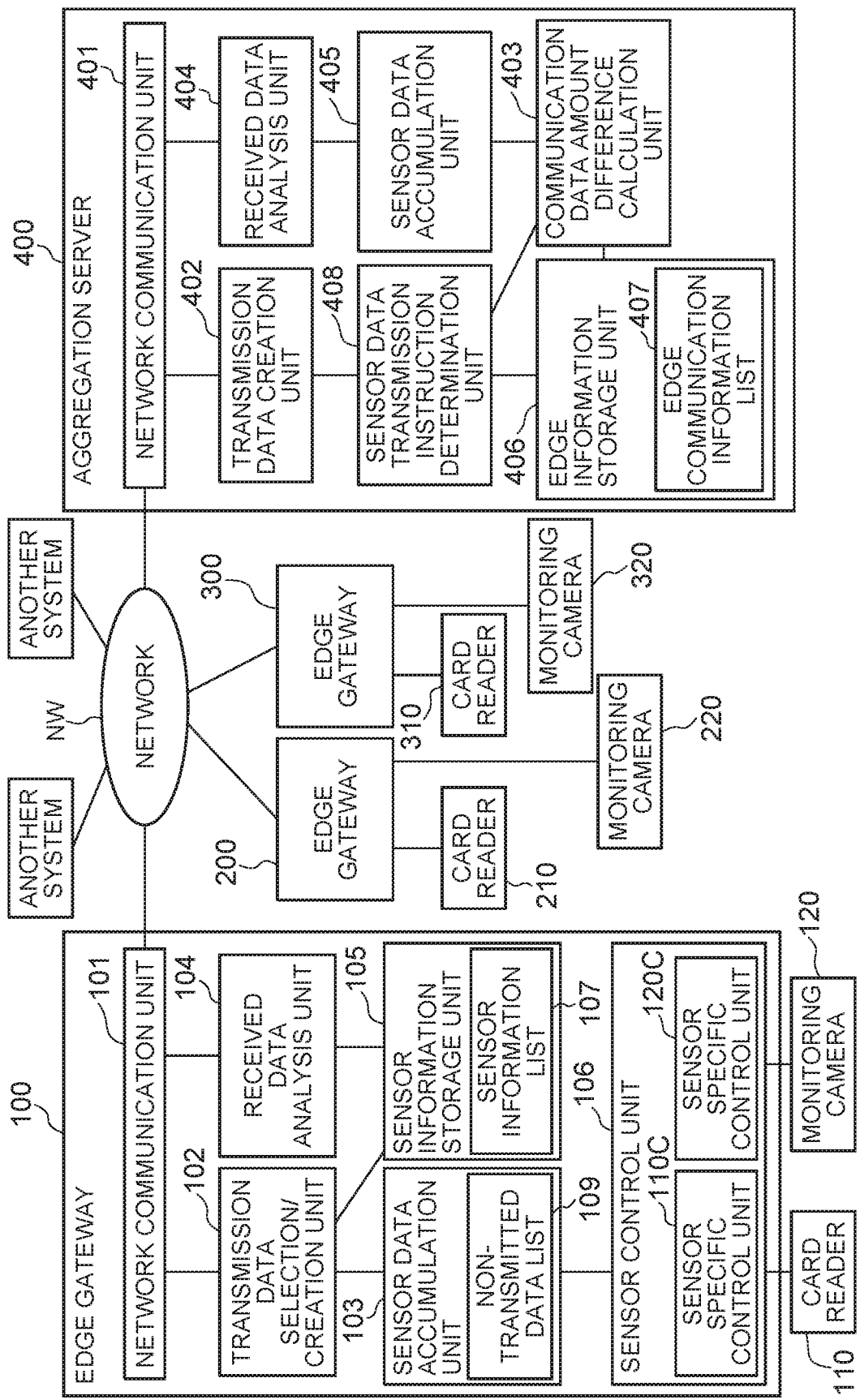
FIG. 10 is a block diagram of a sensor network system according to a second exemplary embodiment of the present invention.

FIG. 10 is a block diagram of a sensor network system according to a second exemplary embodiment of the present invention. The sensor network system of the present embodiment differs from the sensor network system of the first exemplary embodiment illustrated in FIG. 1 in that each of the edge gateways 100, 200, and 300 includes sensor specific control units 110C and 120C. The other parts are the same as those of the sensor network system of the first exemplary embodiment.

The sensor specific control unit 110C corresponds to the card reader 110. The sensor specific control unit 120C corresponds to the monitoring camera 120. Each of the sensor specific control unit 110C and 120C refers to the number of transmittable data units of a corresponding sensor recorded on the sensor information list 107, and determines whether or not the number of transmittable data units is zero. When the number of transmittable data units of the corresponding sensor is not zero, each of the sensor specific control unit 110C and 120C responds to transmission of data from the corresponding sensor. Meanwhile, when the number of transmittable data units of the corresponding sensor is zero, each of the sensor specific control unit 110C and 120C does not respond to transmission of data from the corresponding sensor.

After transmitting data to the sensor control unit 106, the card reader 110 and the monitoring camera 120 that are sensors wait for responses from the sensor specific control units 110C and 120C. When no response is received after waiting for a predetermined period, the card reader 110 and the monitoring camera 120 resend the same data and wait for responses again. The card reader 110 and the monitoring camera 120 repeat such operation until they receive responses. During the period, sensor data is accumulated in the transmission buffer of each of the card reader 110 and the monitoring camera 120.

As described above, in the present embodiment, it is configured that sensor data of a sensor in which transmission from the edge gateway 100 to the aggregation server 400 is suspended is accumulated on the device side of the sensor. As a result, it is possible to reduce the storage capacity for accumulating sensor data in the sensor data accumulation unit 103.

In the present embodiment, the edge gateway 100 includes the sensor data accumulation unit 103. However, in the case where the capacity of the transmission buffer for accumulating sensor data has room on the device side of the sensor, the sensor data accumulation unit 103 may be omitted.

Third Exemplary Embodiment

The sensor network system of the present embodiment differs from the sensor network system of the first exemplary embodiment illustrated in FIG. 1 in the function of the sensor data transmission instruction determination unit 408 of the aggregation server 400. The other parts are the same as those of the sensor network system of the first exemplary embodiment.

The sensor data transmission instruction determination unit 408 of the present embodiment periodically changes a sensor from which sensor data is collected and a sensor in which collection of sensor data is withheld when determining them, on the basis of a surplus of the communication data amount calculated by the communication data amount difference calculation unit 403, that is, the degree of congestion of the communication network. Specifically, it is assumed that the edge gateway 100 is provided with ten sensors in total from No. 1 to No. 10, and they have the same priority, for example. It is also assumed that in order to solve the congestion state of the communication network, collection of every sensor data cannot be continued, and it is necessary to withhold collection of a half of the sensor data, for example. At this time, the sensor data transmission instruction determination unit 408 firstly creates, as an instruction to be transmitted to the edge gateway 100, an instruction in which the number of transmittable data units of the 1st, 3rd, 5th, 7th, and 9th sensors is one, and the number of transmittable data units of the remaining 2nd, 4th, 6th, 8th, and 10th sensors is zero. Also, the sensor data transmission instruction determination unit 408 secondly creates, as an instruction to be transmitted to the edge gateway 100, an instruction in which the number of transmittable data units of the 2nd, 4th, 6th, 8th, and 10th sensors is one, and the number of transmittable data units of the remaining 1st, 3rd, 5th, 7th, and 9th sensors is zero.

As described above, the sensor data transmission instruction determination unit 408 regulates a combination of sensors allowed to transmit data and sensors not allowed to transmit data, each time an instruction is given. Further, the sensor data transmission instruction determination unit 408 determines an instruction to preferentially transmit sensor data of a sensor in which transmission is suspended for a long time. Furthermore, the sensor data transmission instruction determination unit 408 changes sensors to be suspended and sensors not to be suspended, even if the value of the surplus of the communication amount of the sensor data is not changed. Thereby, it is possible to prevent a situation where sensor data of a particular sensor is not collected for a long period.

Fourth Exemplary Embodiment

A sensor network system of the present embodiment differs from the sensor network system of the first exemplary embodiment illustrated in FIG. 1 in the function of the transmission data selection/creation unit 102 of each of the edge gateways 100, 200, and 300. The other parts are the same as those of the sensor network system of the first exemplary embodiment.

The transmission data selection/creation unit 102 of the present embodiment transmits, when the number of transmittable data units of every sensor data recorded on the sensor information list 107 is zero, a message including a time stamp of the transmission time but not including sensor data, at predetermined interval such as 30 seconds or 1 minute from the edge gateway 100 to the aggregation server 400 over the network NW. This message serves as checking of the congestion state of the communication network and heartbeat of the edge gateway 100. This message is referred to as a heartbeat message in the present description.

When the aggregation server 400 receives a heartbeat message from the edge gateway 100, the aggregation server 400 determines the degree of congestion of the communication network on the basis of the difference between time difference between the transmission time and the reception time and the communication period of the heartbeat message in a state where congestion does not occurs. Then, the aggregation server 400 returns a transmission instruction of data for each sensor to the edge gateway 100, by the operation similar to that of steps (7) to (15) of the description of operation in the first exemplary embodiment.

The transmission data selection/creation unit 102 of the edge gateway 100 stops transmission of the heartbeat message when the number of transmittable data units of at least one type of sensor data is one or larger in the instruction returned from the aggregation server 400. Further, when the transmission data selection/creation unit 102 confirms that a state where sensor data cannot be transmitted is continued, the transmission data selection/creation unit 102 continues transmission of the heartbeat message.

As described above, according to the present embodiment, since an instruction transmitted from the aggregation server to the edge gateway is an instruction to stop transmission of data of every sensor connected with the edge gateway, even in a state where there is no sensor data transmitted from the edge gateway to the aggregation server, it is possible to continuously supervise the congestion state of the communication network of the network NW.

Fifth Exemplary Embodiment

Next, a fifth exemplary embodiment of the present invention will be described.

First, a problem to be solved by the present embodiment will be described. In a sensor network system in which three edge gateways 100, 200, and 300 are connected with the aggregation server 400 over the network NW, it is assumed that the edge gateway 200 and the edge gateway 300 share the communication network of the network NW as indicated by the broken lines of FIG. 11. It is also assumed that an available network band at that time in that part is 30 Mbps.

Figure 11:
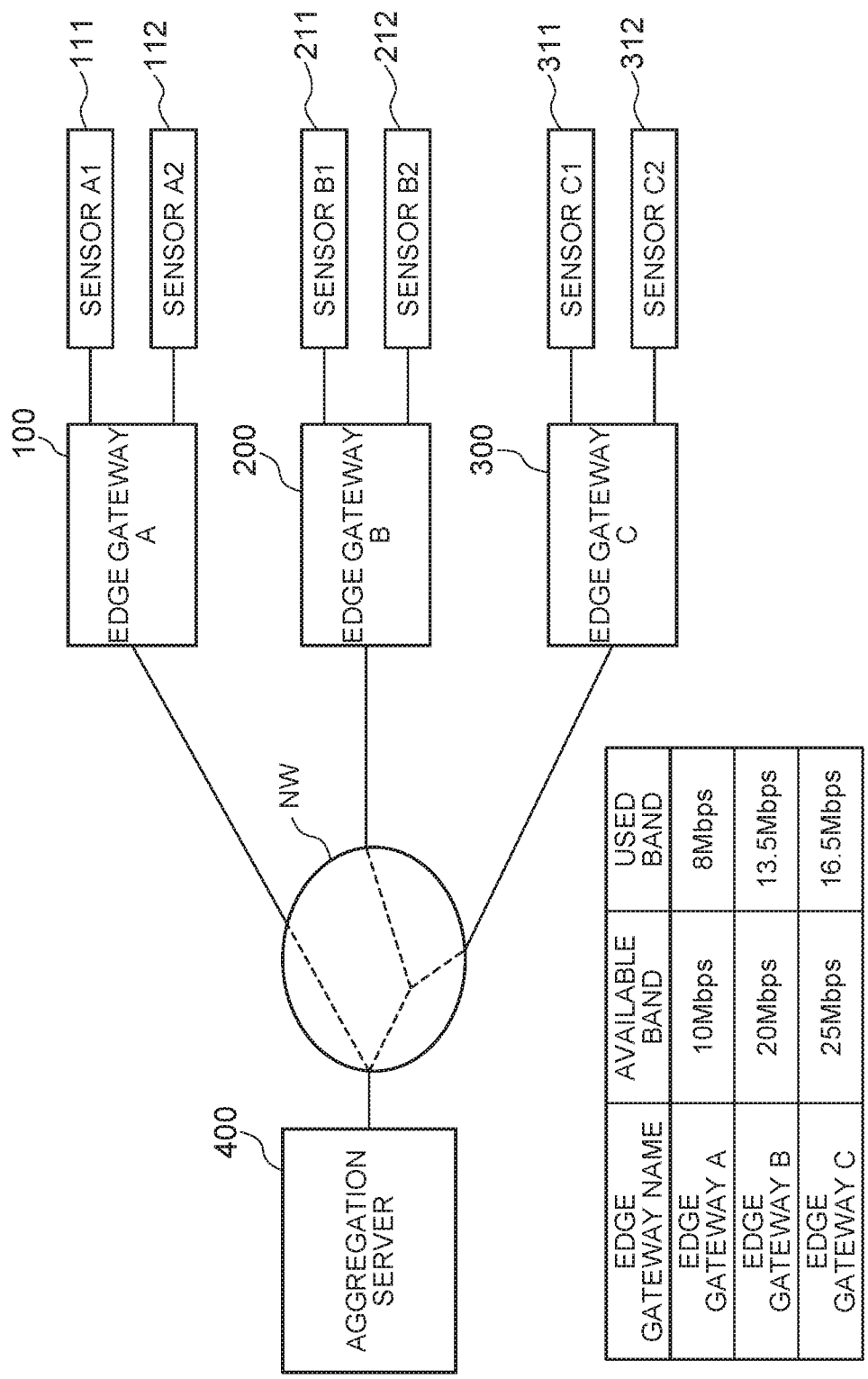
FIG. 11 is a diagram illustrating a problem to be solved by a fifth exemplary embodiment of the present invention.

In the case where it is impossible to know that the edge gateway 200 and the edge gateway 300 share the communication network, it is also impossible to know that the available network band in that part is 30 Mbps. In that case, the aggregation server 400 must perform individual optimization to limit the communication band with respect to each of the edge gateway 200 and the edge gateway 300 independently. Even when the available bands are set to 20 Mbps and 25 Mbps as illustrated in FIG. 11, for example, by such individual optimization from the data amounts transmitted from the respective edge gateways 200 and 300, congestion occurs because the shared part becomes the bottleneck. In that case, it is necessary to set an optimal value through trial and error by regulating the transmittable band of each edge gateway. Therefore, it is difficult to solve the congestion quickly. The present embodiment solves such a problem.

Figure 12:
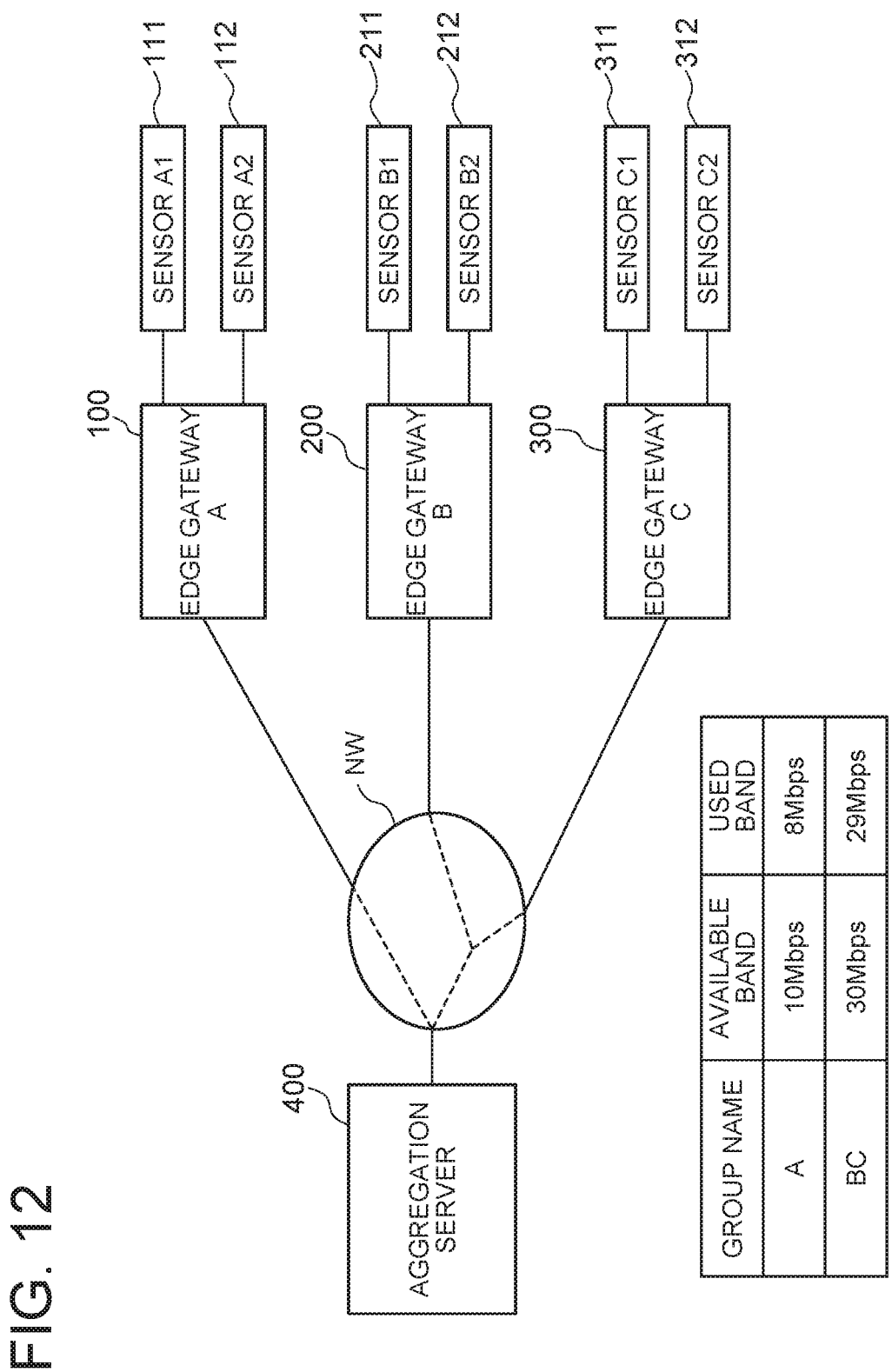
FIG. 12 is a block diagram illustrating a sensor network system according to the fifth exemplary embodiment of the present invention.

FIG. 12 is a block diagram of a sensor network system according to the fifth exemplary embodiment of the present invention. In the sensor network system of the present embodiment, the aggregation server 400 is connected with three edge gateways 100, 200, and 300 over the network NW. Also, the edge gateway 100 is connected with two sensors 111 and 121, the edge gateway 200 is connected with two sensors 211 and 221, and the edge gateway 300 is connected with two sensors 311 and 321. Here, the edge gateways 100, 200, and 300 are the same as the edge gateways 100, 200, and 300 of the first exemplary embodiment illustrated in FIG. 1. On the other hand, the aggregation server 400 differs from the aggregation server 400 of the first exemplary embodiment illustrated in FIG. 1 in the functions of the communication data amount difference calculation unit 403, the edge information storage unit 406, and the sensor data transmission instruction determination unit 408. The other parts are the same as the aggregation server 400 of the first exemplary embodiment.

The communication data amount difference calculation unit 403 of the aggregation server 400 according to the present embodiment has a function similar to the communication data amount difference calculation unit 403 of the first exemplary embodiment and a function of determining a combination of edge gateways that share the same communication network from the transition of increase and decrease of the communication period of time. Specifically, the communication data amount difference calculation unit 403 of the present embodiment has a function of generating a pattern representing variation of a time difference between the transmission time and the reception time of sensor data transmitted from the edge gateway to the aggregation server 400 according to the passage of time (variation pattern) for each edge gateway. The communication data amount difference calculation unit 403 of the present embodiment also has a function of comparing variation patterns of respective edge gateways and determining a combination of edge gateways having the same or similar variation patterns as a group of edge gateways sharing the communication network in which congestion has occurred.

Further, the edge information storage unit 406 of the present embodiment has a function similar to the edge information storage unit 406 of the first exemplary embodiment and a function of accumulating the edge communication information list 407 including information of the variation patterns and the group generated as described above.

FIG. 13 is a diagram illustrating exemplary contents of the edge communication information list 407 according to the present embodiment. Compared with the edge communication information list 407 illustrated in FIG. 4, fields of transmission/reception time variation pattern and group name are added.

Further, the sensor data transmission instruction determination unit 408 of the present embodiment has a function of determining a sensor from which sensor data is collected and a sensor in which collection is withheld, by handling a combination of edge gateways sharing a communication network in which congestion has occurred as one group. When there is no combination of edge gateways sharing a communication network in which congestion has occurred, the sensor data transmission instruction determination unit 408 of the present embodiment functions similarly to the sensor data transmission instruction determination unit 408 of the first exemplary embodiment.

As described above, in the present embodiment, in the sensor network system in which a plurality of edge gateways 100, 200, and 300 are connected with one aggregation server 400, when variations of the communication period between the aggregation server 400 and a plurality of edge gateways of the edge gateways 100, 200, and 300 are similar, it is determined that those edge gateways share the communication network to the aggregation server 400. Then, in the present embodiment, a plurality of edge gateways sharing the communication network are handled as one group, and whether or not it is possible to transmit sensor data to be transmitted is determined in the descending order of importance of the sensor data in group units.

For example, in FIGS. 12 and 13, as a result of measuring the patterns of transmission/reception time variations of the edge gateway 200 and the edge gateway 300, they are similar pattern Y. Therefore, the communication data amount difference calculation unit 403 determines that they share the same communication network that is the bottleneck. Consequently, the sensor data transmission instruction determination unit 408 divides the edge gateways 100, 200, and 300 into group A including the edge gateway 100 and group BC including the edge gateways 200 and 300, and controls the communication amount by the group units. For example, in group BC, there are four sensors namely the sensors 211 and 311 with high priority and the sensors 221 and 321 with low priority. Therefore, the sensor data transmission instruction determination unit 408 allows transmission of sensor data of the sensors 211 and 311 with high priority among the four sensors, and suspends transmission of sensor data of the sensors 221 and 321 with low priority, for example. Alternatively, if the sensors 211 and 221 have low priority and the sensors 311 and 321 have high priority, the sensor data transmission instruction determination unit 408 allows transmission of sensor data of the sensors 311 and 321 with high priority among the four sensors, and suspends transmission of sensor data of the sensors 211 and 321 with low priority. Thereby, of the two edge gateways 200 and 300 sharing the communication network, transmission of sensor data of the sensors 311 and 321 connected with the edge gateway 300 is allowed, and transmission of sensor data of the sensors 211 and 221 connected with the edge gateway 200 is suspended. It is unlikely to realize such an instruction by the individual optimization. According to the present embodiment, it is possible to realize optimization of the entire system in consideration of data transmission from a plurality of edge gateways.

Sixth Exemplary Embodiment

Figure 14:
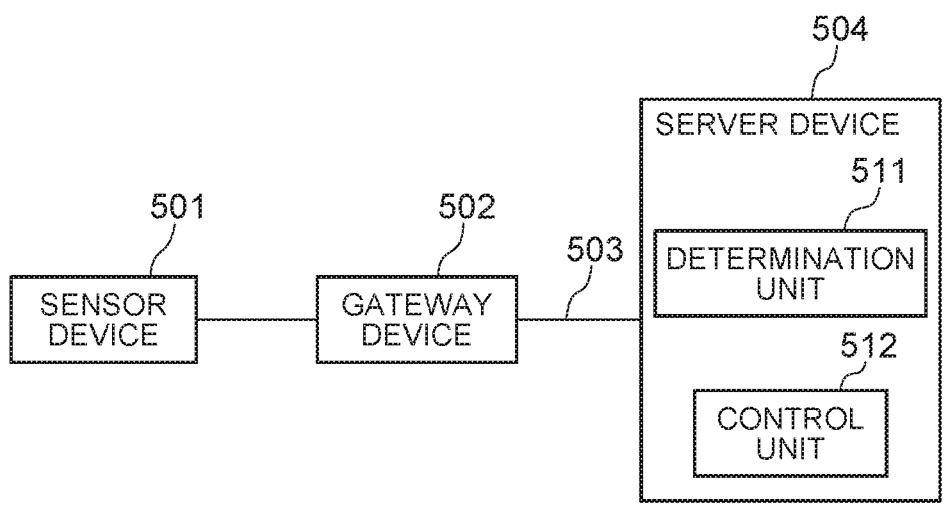
FIG. 14 is a block diagram of a sensor network system according to a sixth exemplary embodiment of the present invention.

Referring to FIG. 14, a sensor network system according to a sixth exemplary embodiment of the present invention includes at least one sensor device 501, at least one gateway device 502 that collects sensor data from the sensor device 501, and a server device 504 that is connected with the gateway device 502 over a communication network 503 and collects sensor data from the gateway device 502 over the communication network 503. The server device 504 includes a determination unit 511 and a control unit 512.

The determination unit 511 of the server device 504 has a function of determining the degree of congestion of the communication network 503 on the basis of a difference between the time difference between the transmission time and the reception time of sensor data transmitted from the gateway device 502 to the server device 504 and the communication period of time taken in a state where congestion does not occur. The determination unit 511 can be realized by the network communication unit 401, the received data analysis unit 404, the sensor data accumulation unit 405, and the communication data amount difference calculation unit 403 in FIG. 1, for example, but not limited thereto.

The control unit 512 of the server device 504 has a function of determining a server device 501 from which sensor data is collected and a sensor device 501 in which collection of sensor data is withheld, on the basis of the determination result of the determination unit 511. The control unit 512 also has a function of sending an instruction including the determined content to the gateway device 502. The control unit 512 can be realized by the edge information storage unit 406, the sensor data transmission instruction determination unit 408, the transmission data creation unit 402, and the network communication unit 401 in FIG. 1, for example, but not limited thereto.

The sensor network system according to the present embodiment configured as described above operates as described below. That is, the gateway device 502 collects sensor data from the sensor device 501, and transmits it to the server device 504 over the communication network 503. The determination unit 511 of the server device 504 determines the degree of congestion of the communication network 503 on the basis of a difference between the time difference between the transmission time and the reception time of sensor data transmitted from the gateway device 502 to the server device 504 and the communication period of time taken in a state where congestion does not occur. Then, the control unit 512 of the server device 504 determines the sensor device 501 from which sensor data is collected and the server device 501 in which collection of sensor data is withheld on the basis of the determination result of the degree of congestion of the communication network 503, and sends an instruction including the determined content to the gateway device 502. In accordance with the instruction, the gateway device 502 selects sensor data, to be transmitted to the server device 504, from the sensor data of the sensor device 501 to create transmission data, and transmits it to the sensor device 504.

As described above, according to the present embodiment, when congestion occurs on the communication network connecting the gateway device 502 and the server device 504, it is possible to detect and solve it. The reason is that the determination unit 511 of the server device 504 determines the degree of congestion of the communication network 503 on the basis of a difference between the time difference between the transmission time and the reception time of sensor data transmitted from the gateway device 502 to the server device 504 and the communication period of time in a state where no congestion occurs, and the control unit 512 of the server device 504 determines the sensor device 501 from which sensor data is collected and the sensor device 501 in which collection of sensor data is withheld on the basis of the determination result of the determination unit 511, and sends an instruction including the determined content to the gateway device 502.

The present invention can be modified as described below.

For example, the control unit 512 may be configured to, when the communication network 503 is congested, determine the content including the increased number of sensor devices 501 in which collection of sensor data is withheld, compared with the determined content included in the instruction sent to the gateway device 502 last time.

Further, the control unit 511 may be configured to, when the communication network 503 is not congested, determine the content including a decreased number of sensor devices 501 in which collection of sensor data is withheld, compared with the determined content included in the instruction sent to the gateway device 502 last time.

Further, the control unit 511 may be configured to determine the sensor device 501 from which collection of sensor data is performed and the sensor device 501 in which collection of sensor data is withheld, on the basis of the priority of the sensor devices 501.

Further, the control unit 511 may be configured to determine the number of transmittable data units indicating the number of times of collection of sensor data for the sensor device 501 from which sensor data is collected, according to the degree of congestion of the communication network 503, and include the determined content in the instruction.

Further, the control unit 511 may be configured to periodically change the sensor device 501 from which sensor data is collected and the sensor device 501 in which collection of sensor data is withheld.

Further, the control unit 511 may be configured to generate a variation pattern along with elapse of the period of the time difference for each of the gateway devices 502, determine a combination of the gateway devices 502 sharing the communication network 503 on which congestion has occurred by comparing the generated variation patterns of the respective gateway devices, and by handling the determined combination of the gateway devices as one group, determine the sensor device 501 from which sensor data is collected and the sensor device 501 in which collection of sensor data is withheld.

Further, the gateway device 502 may be configured not to respond intentionally to transmission of sensor data from the sensor device 501 that does not perform transmission to the server device 504, to thereby allow the sensor data to be remained in the transmission buffer of the sensor device 501, in accordance with the instruction.

Further, the gateway device 502 may be configured to periodically transmit a heartbeat message including the transmission time, during the period in which sensor data of any of the sensor devices 501 is not transmitted to the server device 504, in accordance with the instruction. In that case, the determination unit 511 of the server device 504 may be configured to determine the degree of congestion of the communication network 503 on the basis of a difference between the time difference between the transmission time and the reception time of the heartbeat message and the communication period of time taken in a state where congestion does not occur.

While the present invention has been described with reference to the exemplary embodiments described above, the present invention is not limited to the above-described embodiments. The form and details of the present invention can be changed within the scope of the present invention in various manners that can be understood by those skilled in the art.

For example, in the sensor network system according to the first exemplary embodiment illustrated in FIG. 1, the transmission data selection/creation unit 102 of the edge gateway 100 may transmit the number of non-transmitted data units of each sensor (card reader, monitoring camera) recorded on the non-transmitted data list 109 to the aggregation server 400, in addition to the transmission data including the sensor data or independent of the transmission data including the sensor data. The edge information storage unit 406 of the aggregation server 400 may record the number of non-transmitted data units of each type of sensor data received from the edge gateway 100 as one row of each entry of the edge communication information list 407. Further, when different numbers of sensor data units are included for the card reader and the monitoring camera in one unit of received data, the edge information storage unit 406 of the aggregation server 400 may determine that the sensor data units of the smaller number remain in the edge gateway, and increase the number of non-transmitted data units of the sensor data of the smaller number on the edge communication information list 407 by the number that is smaller than the other. Further, the sensor data transmission instruction determination unit 408 of the aggregation server 400 may be configured to determine a sensor from which sensor data is collected and the number of transmittable data units and a sensor in which collection of sensor data is withheld, on the basis of the number of transmittable data units of each type of sensor data recorded on the edge communication information list 407. For example, when the communication network is free, the sensor data transmission instruction determination unit 408 may preferentially incorporate sensor data having a larger number of non-transmitted data units in the transmission target.

The present invention is based upon and claims the benefit of priority from Japanese patent application No. 2017-062787, filed on Mar. 28, 2017, the disclosure of which is incorporated herein in its entirety by reference.

INDUSTRIAL APPLICABILITY

The present invention is applicable to sensor network systems generally. The present invention is also applicable to the field of security having a configuration in which a monitoring camera is additionally provided to an existing building and monitoring is performed at a remote place over a shared network. Moreover, the present invention is also applicable to the field of science having a configuration of collecting a large amount of observed data by using an existing network.

The whole or part of the exemplary embodiments disclosed above can be described as, but not limited to, the following supplementary notes.

(Supplementary Note 1)

A sensor network system comprising:

at least one gateway device that collects sensor data from at least one sensor device; and a server device connected with the gateway device over a communication network, the server device collecting the sensor data from the gateway device over the communication network, wherein the server device includes:

a determination unit that determines a degree of congestion of the communication network on a basis of a difference between a time difference, between a transmission time and a reception time of the sensor data transmitted from the gateway device to the server device, and a communication period of time taken in a state where congestion does not occur; and a control unit that determines, among a plurality of the sensor devices, a sensor device from which the sensor data is collected and a sensor device in which collection of the sensor data is withheld, on a basis of a determination result of the degree of congestion of the communication network, and sends an instruction including a determined content to the gateway device.

(Supplementary Note 2)

The sensor network system according to supplementary note 1, wherein when the communication network is congested, the control unit determines a content including an increased number of sensor devices in which collection of the sensor data is withheld, compared with the determined content included in the instruction sent to the gateway device last time.

(Supplementary Note 3)

The sensor network system according to supplementary note 1 or 2, wherein when the communication network is not congested, the control unit determines a content including a decreased number of sensor devices in which collection of the sensor data is withheld, compared with the determined content included in the instruction sent to the gateway device last time.

(Supplementary Note 4)

The sensor network system according to any of supplementary notes 1 to 3, wherein the control unit determines, among the sensor devices, a sensor device from which the sensor data is collected and a sensor device in which collection of the sensor data is withheld, on a basis of priority of the sensor devices.

(Supplementary Note 5)

The sensor network system according to any of supplementary notes 1 to 4, wherein for the sensor device from which the sensor data is collected, the control unit determines a number of transmittable data units representing a number of times of collection of the sensor data, according to the degree of congestion of the communication network.

(Supplementary Note 6)

The sensor network system according to any of supplementary notes 1 to 5, wherein the control unit periodically changes the sensor device from which the sensor data is collected and the sensor device in which collection of the sensor data is withheld.

(Supplementary Note 7)

The sensor network system according to any of supplementary notes 1 to 6, wherein the control unit generates a variation pattern of the time difference for each of a plurality of the gateway devices, compares the generated variation patterns of the gateway devices and determines a combination of the gateway devices that share the communication network on which congestion has occurred, and by handling the determined combination of the gateway devices as one group, determines the sensor device from which the sensor data is collected and the sensor device in which collection of the sensor data is withheld.

(Supplementary Note 8)

The sensor network system according to any of supplementary notes 1 to 7, wherein the gateway device includes a control unit that selects a unit of sensor data to be transmitted to the server device from among units of the sensor data of the sensor device and create transmission data, in accordance with the instruction.

(Supplementary Note 9)

The sensor network system according to supplementary note 8, wherein the control unit of the gateway device does not respond intentionally to transmission of the sensor data from the sensor device that does not perform transmission to the server device to thereby allow the sensor data to remain in a transmission buffer of the sensor device, in accordance with the instruction.

(Supplementary Note 10)

The sensor network system according to supplementary note 8 or 9, wherein the control unit of the gateway device periodically transmits a heartbeat message including the transmission time during a period in which the sensor data of any of the sensor devices is not transmitted to the server device, in accordance with the instruction, and the determination unit determines the degree of congestion of the communication network on a basis of a difference between a time difference between a transmission time and a reception time of the heartbeat message and the communication period of time taken in a state where congestion does not occur.

(Supplementary Note 11)

A server device connected with a gateway device over a communication network, the gateway device collecting sensor data from a sensor device, the server device collecting the sensor data from the gateway device over the communication network, the server device comprising:

a determination unit that determines a degree of congestion of the communication network on a basis of a difference between a time difference, between a transmission time and a reception time of the sensor data transmitted from the gateway device to the server device, and a communication period of time taken in a state where congestion does not occur; and a control unit that determines, among a plurality of the sensor devices, a sensor device from which the sensor data is collected and a sensor device in which collection of the sensor data is withheld, on a basis of a determination result of the degree of congestion of the communication network, and sends an instruction including a determined content to the gateway device.

(Supplementary Note 12)

The server device according to supplementary note 11, wherein when the communication network is congested, the control unit determines a content including an increased number of sensor devices in which collection of the sensor data is withheld, compared with the determined content included in the instruction sent to the gateway device last time.

(Supplementary Note 13)

The server device according to supplementary note 11 or 12, wherein when the communication network is not congested, the control unit determines a content including a decreased number of sensor devices in which collection of the sensor data is withheld, compared with the determined content included in the instruction sent to the gateway device last time.

(Supplementary Note 14)

The server device according to any of supplementary notes 11 to 13, wherein the control unit determines, among the sensor devices, a sensor device from which the sensor data is collected and a sensor device in which collection of the sensor data is withheld, on a basis of priority of the sensor devices.

(Supplementary Note 15)

The server device according to any of supplementary notes 11 to 14, wherein for the sensor device from which the sensor data is collected, the control unit determines a number of transmittable data units representing a number of times of collection of the sensor data, according to the degree of congestion of the communication network.

(Supplementary Note 16)

The server device according to any of supplementary notes 11 to 15, wherein the control unit periodically changes the sensor device from which the sensor data is collected and the sensor device in which collection of the sensor data is withheld.

(Supplementary Note 17)

The server device according to any of supplementary notes 11 to 16, wherein the control unit generates a variation pattern of the time difference for each of a plurality of the gateway devices, compares the generated variation patterns of the gateway devices and determines a combination of the gateway devices that share the communication network on which congestion has occurred, and by handling the determined combination of the gateway devices as one group, determines the sensor device from which the sensor data is collected and the sensor device in which collection of the sensor data is withheld.

(Supplementary Note 18)

A sensor data collection controlling method performed by a server device connected with a gateway device over a communication network, the gateway device collecting sensor data from a sensor device, the server device collecting the sensor data from the gateway device over the communication network, the method comprising:

determining a degree of congestion of the communication network on a basis of a difference between a time difference, between a transmission time and a reception time of the sensor data transmitted from the gateway device to the server device, and a communication period of time taken in a state where congestion does not occur; and determining, among a plurality of the sensor devices, a sensor device from which the sensor data is collected and a sensor device in which collection of the sensor data is withheld, on a basis of a determination result of the degree of congestion of the communication network, and sending an instruction including a determined content to the gateway device.

(Supplementary Note 19)

The sensor data collection controlling method according to supplementary note 18, wherein the sending the instruction includes, when the communication network is congested, sending a content including an increased number of sensor devices in which collection of the sensor data is withheld, compared with the determined content included in the instruction sent to the gateway device last time.

(Supplementary Note 20)

The sensor data collection controlling method according to supplementary note 18 or 19, wherein the sending the instruction includes, when the communication network is not congested, sending a content including a decreased number of sensor devices in which collection of the sensor data is withheld, compared with the determined content included in the instruction sent to the gateway device last time.

(Supplementary Note 21)

The sensor data collection controlling method according to any of supplementary notes 18 to 20, wherein in the determining, among the sensor devices, the sensor device from which the sensor data is collected and the sensor device in which collection of the sensor data is withheld, the determining is performed on a basis of priority of the sensor devices.

(Supplementary Note 22)

The sensor data collection controlling method according to any of supplementary notes 18 to 21, wherein the sending the instruction includes sending the instruction including a number of transmittable data units representing a number of times of collection of the sensor data determined according to the degree of congestion of the communication network for the sensor device from which the sensor data is collected.

(Supplementary Note 23)

The sensor data collection controlling method according to any of supplementary notes 18 to 22, wherein the sending the instruction includes sending the instruction in which the sensor device from which the sensor data is collected and the sensor device in which collection of the sensor data is withheld are changed periodically.

(Supplementary Note 24)

The sensor data collection controlling method according to any of supplementary notes 18 to 23, wherein the determining the sensor device from which the sensor data is collected and the sensor device in which collection of the sensor data is withheld includes generating a variation pattern of the time difference for each of a plurality of the gateway devices, comparing the generated variation patterns of the gateway devices, and determining a combination of the gateway devices that share the communication network on which congestion has occurred, and by handling the determined combination of the gateway devices as one group, determining the sensor device from which the sensor data is collected and the sensor device in which collection of the sensor data is withheld.

(Supplementary Note 25)

A program for causing a computer to function as, the computer being connected, over a communication network, with a gateway device that collects sensor data from a sensor device, the computer collecting the sensor data from the gateway device over the communication network:

a determination unit that determines a degree of congestion of the communication network on a basis of a difference between a time difference, between a transmission time and a reception time of the sensor data transmitted from the gateway device to the server device, and a communication period of time taken in a state where congestion does not occur; and a transmission data control unit that determines, among a plurality of the sensor devices, a sensor device from which the sensor data is collected and a sensor device in which collection of the sensor data is withheld, on a basis of a determination result of the degree of congestion of the communication network, and sends an instruction including a determined content to the gateway device.

(Supplementary Note 26)

A gateway device that collects sensor data from at least one sensor device and transmits the sensor data to a server device over a communication network, the device comprising:

a received data analysis unit that receives, from the server device over the communication network, and analyzes an instruction that identifies, among a plurality of the sensor devices, a sensor device from which the sensor data is collected and a sensor device in which collection of the sensor data is withheld, determined on a basis of a degree of congestion of the communication network; and a control unit that selects a unit of the sensor data to be transmitted to the server device, from among units of the sensor data of the sensor devices and creates transmission data, in accordance with the instruction.

(Supplementary Note 27)

The gateway device according to supplementary note 26, wherein the control unit does not respond intentionally to transmission of the sensor data from the sensor device that does not perform transmission to the server device to thereby allow the sensor data to remain in a transmission buffer of the sensor device, in accordance with the instruction.

(Supplementary Note 28)

The gateway device according to supplementary note 26 or 27, wherein the control unit periodically transmits a heartbeat message including a transmission time during a period in which the sensor data of any of the sensor devices is not transmitted to the server device, in accordance with the instruction.

REFERENCE SIGNS LIST 100 edge gateway
101 network communication unit
102 transmission data selection/creation unit
103 sensor data accumulation unit
104 received data analysis unit
105 sensor information storage unit
106 sensor control unit
107 sensor information list
109 non-transmitted data list
110 card reader
110C sensor specific control unit
113 employee ID card
120 monitoring camera
120C sensor specific control unit
200 edge gateway
210 card reader
220 monitoring camera
300 edge gateway
310 card reader
320 monitoring camera
400 aggregation server
401 network communication unit
402 transmission data creation unit
403 communication data amount difference calculation unit
404 received data analysis unit
405 sensor data accumulation unit
406 edge information storage unit
407 edge communication information list
408 sensor data transmission instruction determination unit
501 sensor device
502 gateway device
503 communication network
504 server device
511 determination unit
512 control unit
1001 operation input unit
1002 screen display unit
1003 communication interface unit
1004 storage unit
1005 arithmetic processing unit
1006 information processing device
1007 program
NW network

What is claimed is:

1. A sensor data collection controlling method performed in a sensor network system including a plurality of gateway devices that collect sensor data from one or more sensor devices, and a server device connected with the gateway devices over a communication network, the server device collecting the sensor data from the gateway devices over the communication network, the method comprising:
by the server device,
determining a degree of congestion of the communication network based on a difference between a time difference between a transmission time and a reception time of the sensor data transmitted from each of the gateway devices to the server device, and a communication period of time taken in a state where congestion does not occur; and
generating a variation pattern of the time difference for each of the gateway devices, comparing respective generated variation patterns of the gateway devices and determining a combination of the gateway devices sharing the communication network on which congestion has occurred, and by handling the determined combination of the gateway devices sharing the communication network on which the congestion has occurred as one group, determining a first sensor device from which the sensor data is collected and a second sensor device in which collection of the sensor data is withheld, in a group unit;
and by each of the gateway devices,
receiving, from the server device over the communication network, and analyzing a third instruction that identifies the first sensor device from which the sensor data is collected and the second sensor device in which collection of the sensor data is withheld
wherein the determining the first sensor device and the second sensor device includes determining the first sensor device and the second sensor device based on a priority of the one or more sensor devices; and
in accordance with the third instruction, selecting the sensor data to be transmitted to the server device from among the sensor data of the one or more sensor devices and creating transmission data.

2. The sensor data collection controlling method according to claim 1, further comprising: by at least one of the gateway devices, periodically transmitting a heartbeat message including the transmission time during a period in which the sensor data of any of the one or more sensor devices is not transmitted to the server device; and by at least one of the gateway devices, determining the degree of congestion of the communication network based on a difference between a time difference between a transmission time and a reception time of the heartbeat message, and the communication period of time taken in the state where the congestion does not occur.

3. A sensor network system comprising:
a plurality of gateway devices that collect sensor data from one or more sensor devices; and
a server device connected with the gateway devices over a communication network, the server device collecting the sensor data from the gateway devices over the communication network, wherein the server device includes;
a first memory for storing a first instruction; and
at least one first processor configured to execute the first instruction to:
determine a degree of congestion of the communication network based on a difference between a time difference between a transmission time and a reception time of the sensor data transmitted from each of the gateway devices to the server device, and a communication period of time taken in a state where congestion does not occur; and
generate a variation pattern of the time difference for each of the gateway devices, compare respective generated variation patterns of the gateway devices and determine a combination of the gateway devices sharing the communication network on which congestion has occurred, and by handling the determined combination of the gateway devices sharing the communication network on which the congestion has occurred as one group, determine a first sensor device from which the sensor data is collected and a second sensor device in which collection of the sensor data is withheld, in a group unit, wherein to determine the first sensor device from which the sensor data is collected and the second sensor device in which collection of the sensor data is withheld, is based on a priority of the one or more sensor devices; and each of the gateway devices includes:
a second memory for storing a second instruction; and
at least one second processor configured to execute the second instruction to:
receive, from the server device over the communication network, and analyze a third instruction that identifies the first sensor device from which the sensor data is collected and the second sensor device in which collection of the sensor data is withheld; and
in accordance with the third instruction, select the sensor data to be transmitted to the server device from among the sensor data of the one or more sensor devices and create transmission data.

4. The sensor network system according to claim 3, wherein the at least one second processor is further configured to execute the second instruction to transmit a heartbeat message including the transmission time during a period in which the sensor data of any of the one or more sensor devices is not transmitted to the server device, in accordance with the third instruction, and the at least one first processor is further configured to execute the first instruction to determine the degree of congestion of the communication network based on a difference between a time difference between a transmission time and a reception time of the heartbeat message, and the communication period of time taken in the state where the congestion does not occur.

* * * * *